INVENTORS
ROBERT O. GUNDERSON
GEORGE L. FOSTER

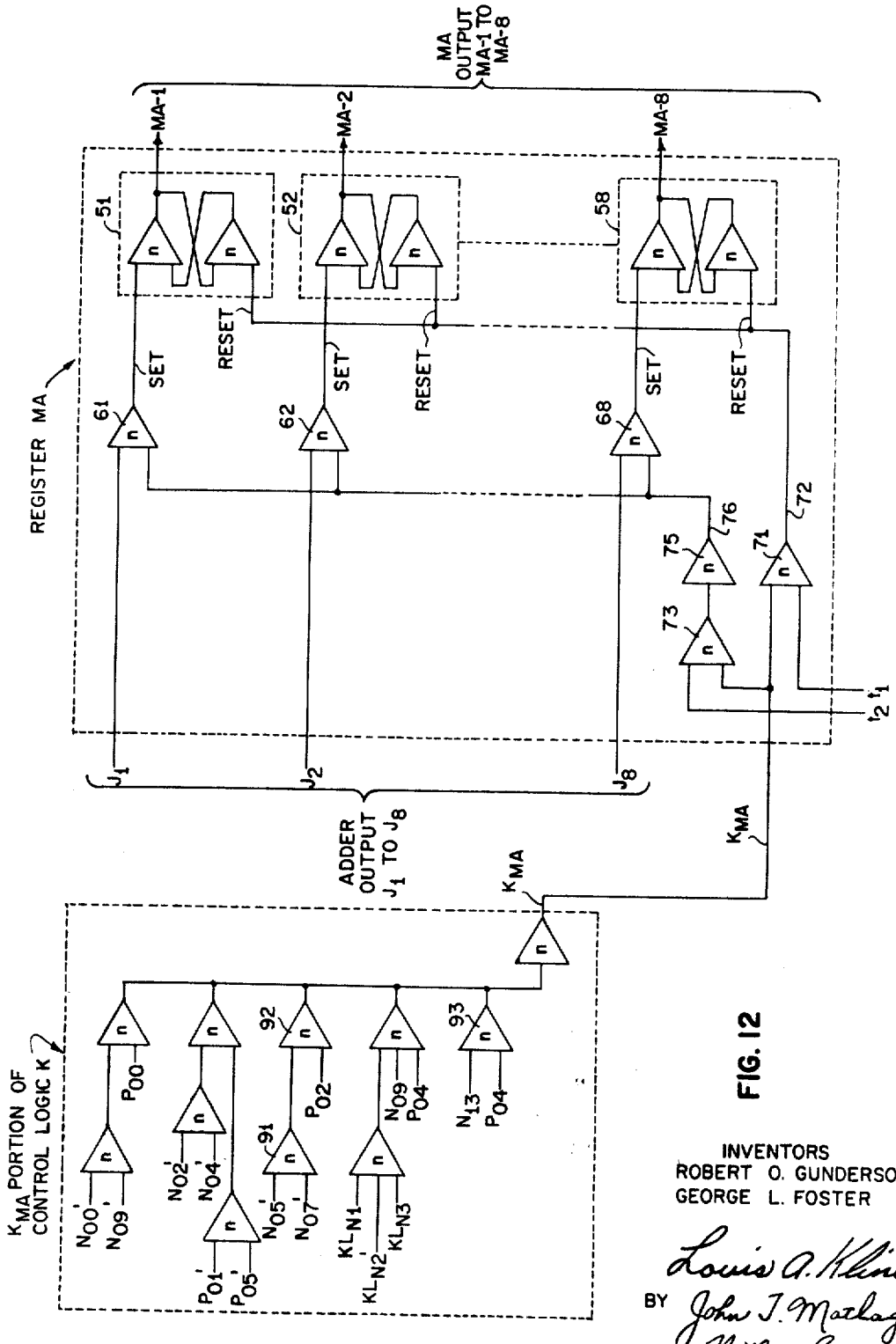

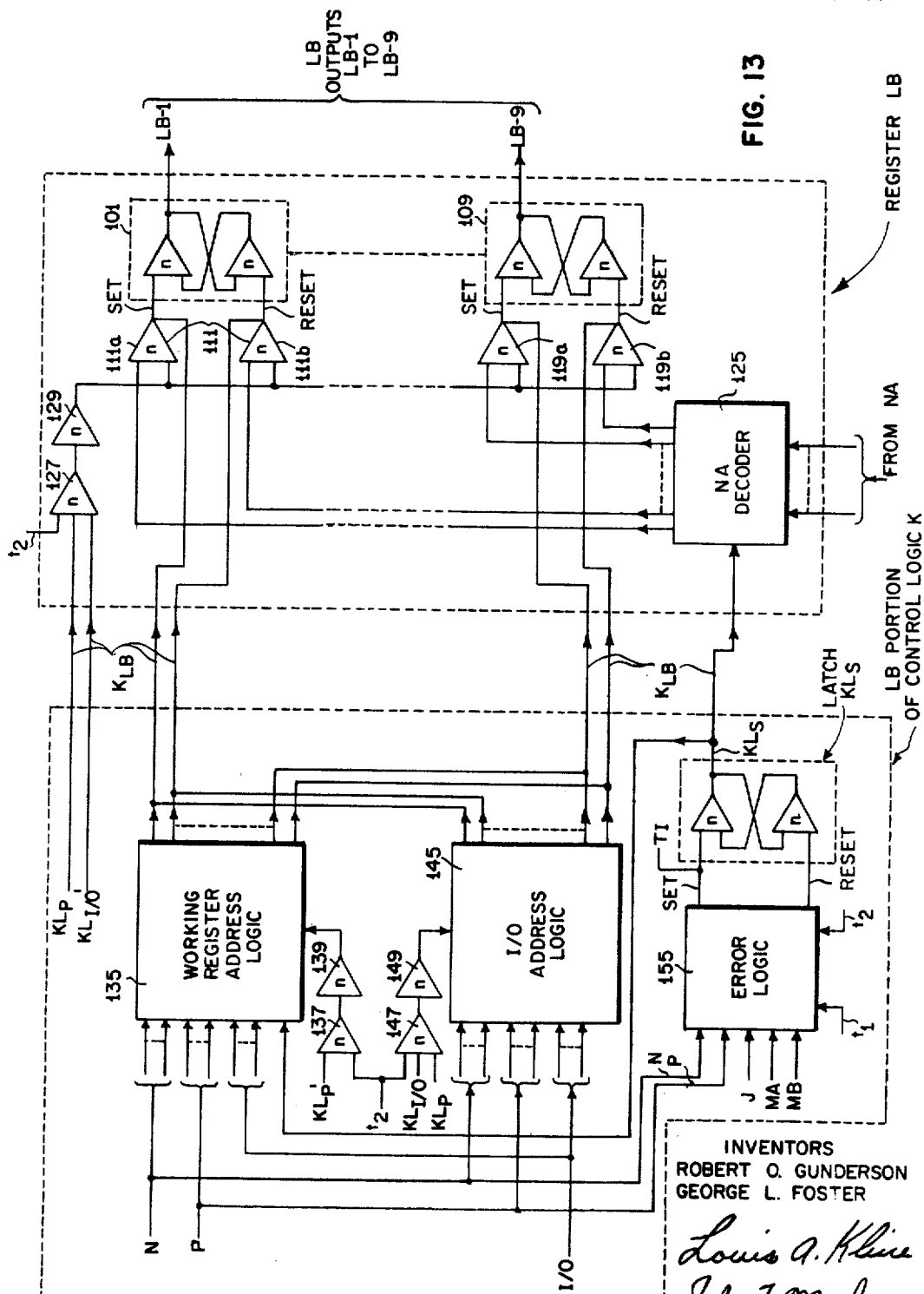

United States Patent Office 3,493,936
Patented Feb. 3, 1970

3,493,936
LOW COST HIGH CAPABILITY ELECTRONIC
DATA PROCESSING SYSTEM
Robert O. Gunderson, Torrance, and George L. Foster,
Hawthorne, Calif., assignors to The National Cash
Register Company, Dayton, Ohio, a corporation of
Maryland
Filed May 4, 1967, Ser. No. 636,147
Int. Cl. G11b *13/00;* G06f *1/00, 7/00*
U.S. Cl. 340—172.5                              46 Claims

ABSTRACT OF THE DISCLOSURE

A data processing system having a high speed random access memory including operand and command storage sections and addressable by an address register. The memory has a further storage section addressable by an additional address register and containing registers storing control information such as the current command and the address of the next command. Separate sets of registers are provided for supervisor control and user control, corresponding registers of each of these sets being separated by a constant address difference. Transfers between the supervisor and user states can thus be rapidly effected namely by incrementing or decrementing the relevant address register by the constant address difference. Commands are executed by performing a sequence of micro-commands, the micro-commands requiring varying numbers of basic processor cycles for their execution.

---

The invention relates to a general purpose data processing system and more particularly to a novel combination of circuits for performing during each basic processor cycle of the system the functions required of a general purpose computer.

Generally, the present invention involves a high speed, high capability, low cost electronic data processing system capable of multiple degrees of simultaneity and having a family of commands, including an input-output command for placing a peripheral in a selected condition for data transfer operations. Each command is executed by serially performing a predetermined combination of micro-commands, each micro-command being in turn performed by a variable plurality of program counts sequentially advancing in a fixed predetermined manner in synchronism with the occurrence of the basic cycles of the computer system. A special input-output micro-command is provided to handle input-output data transfer operations with selected peripherals and is capable of being inserted in a micro-command flow in response to a request from a selected peripheral. The computer system includes a high speed random access memory operating every cycle and containing operand and command storage sections and a working register storage section having a set of user registers and a corresponding set of supervisor registers at a fixed address relationship with respect thereto, whereby to facilitate switching of operations between supervisor and user states. The memory and the logical circuitry of the system both derive their timing from taps provided along a single delay line whose length serves to establish the period of the basic cycle for the system.

The specific nature of the invention as well as the objects, advantages and features thereof will become apparent from the following description of a preferred embodiment in conjunction with the accompanying drawings in which:

FIG. 1 generally illustrates a general purpose electronic data processing system in accordance with the invention;

Figure 4:
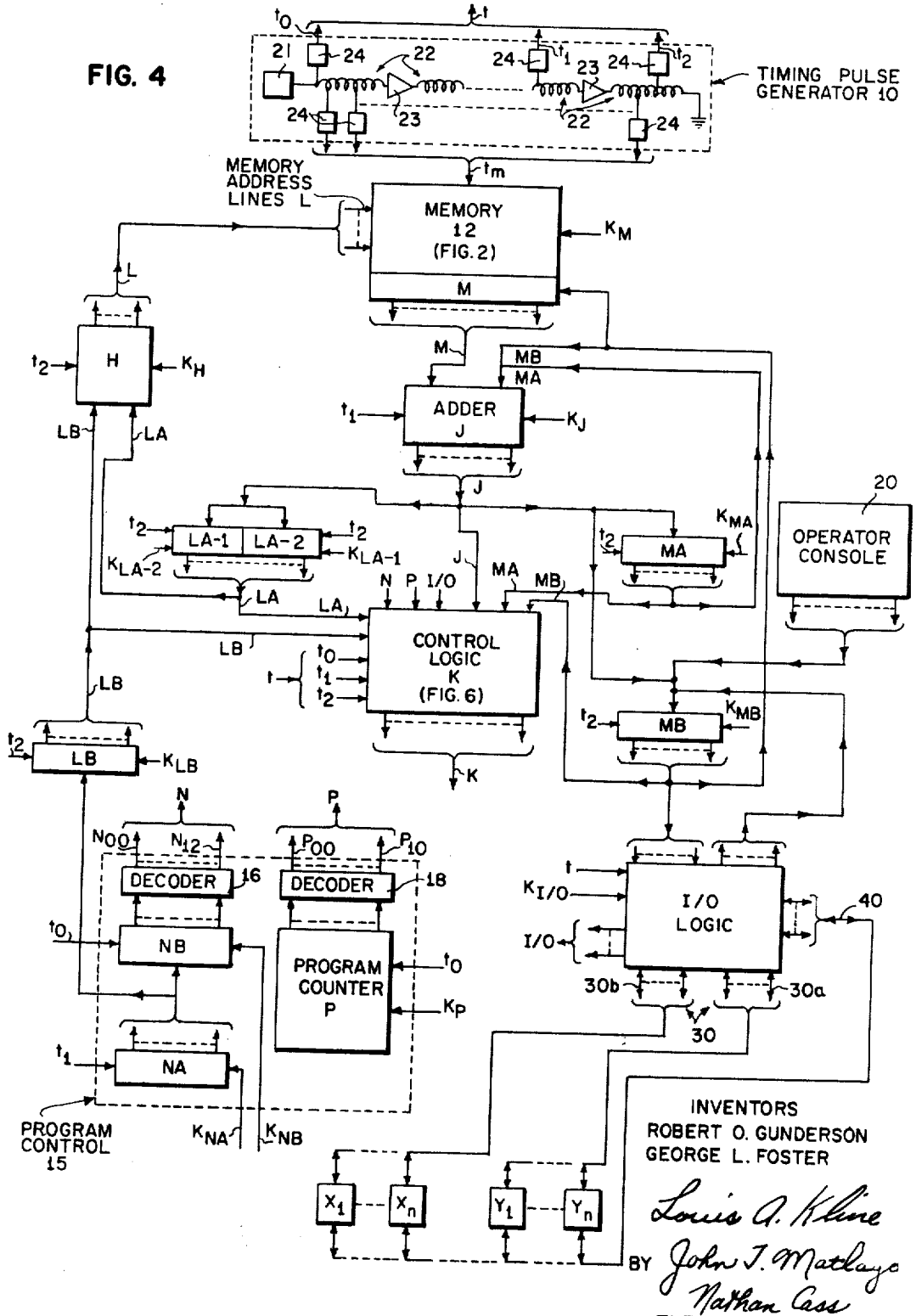
FIG. 4 is an electrical block diagram illustrating hardware details of the system of FIG. 1.
Figure 7:
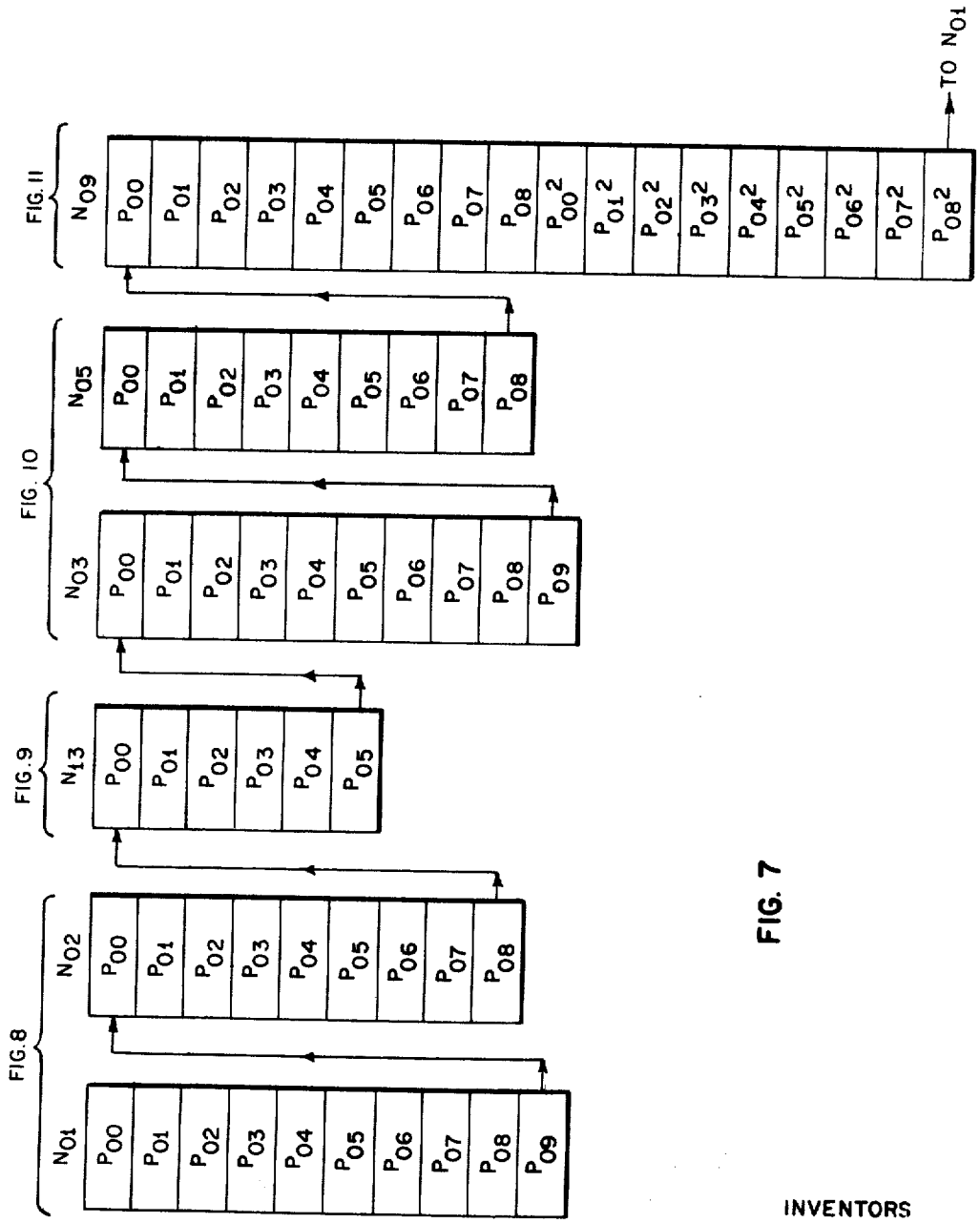
FIG. 7 is a schematic flow diagram specifying the basic cycles occurring during the execution of the micro-commands of a typical command.
Figure 8:
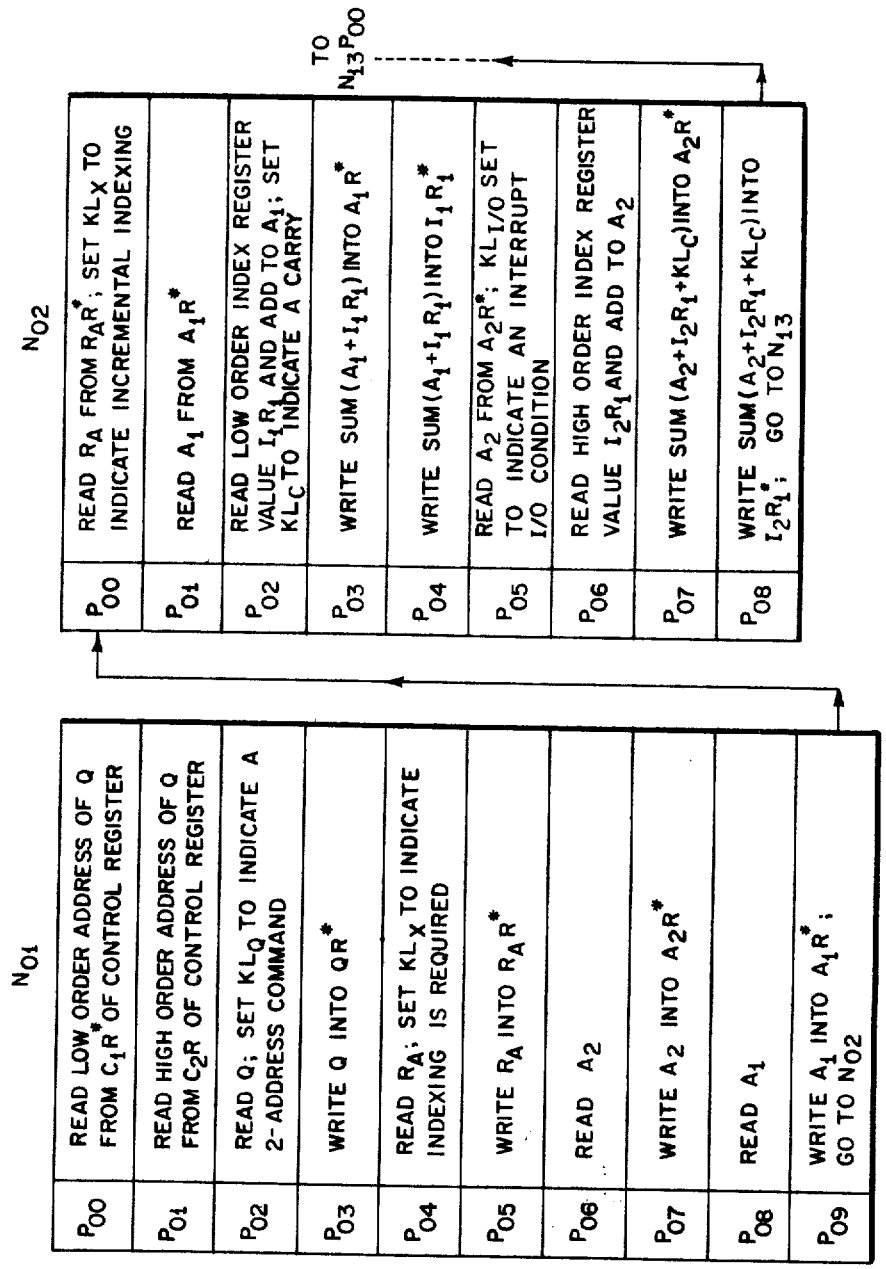
Figure 10:
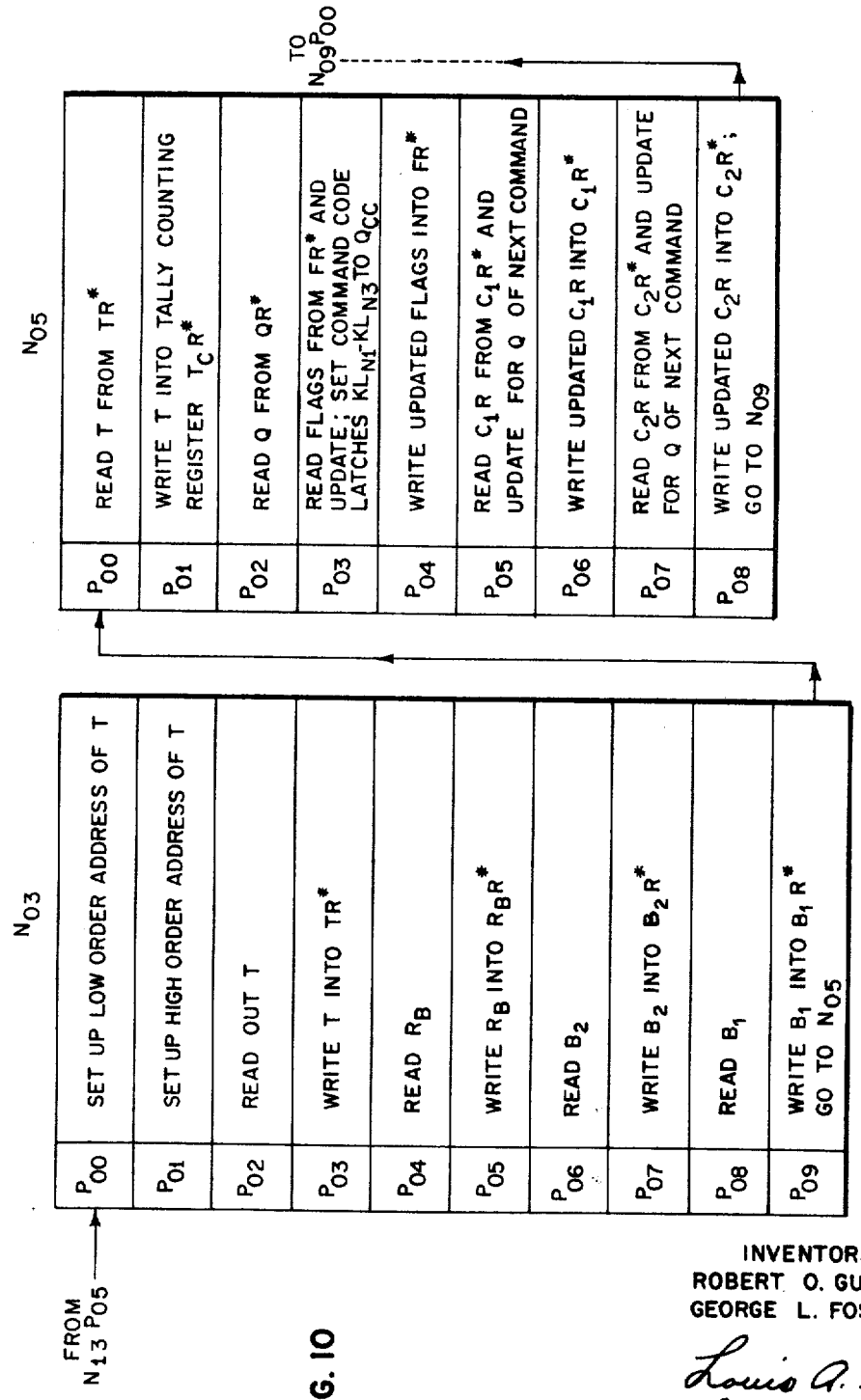
Figure 11:
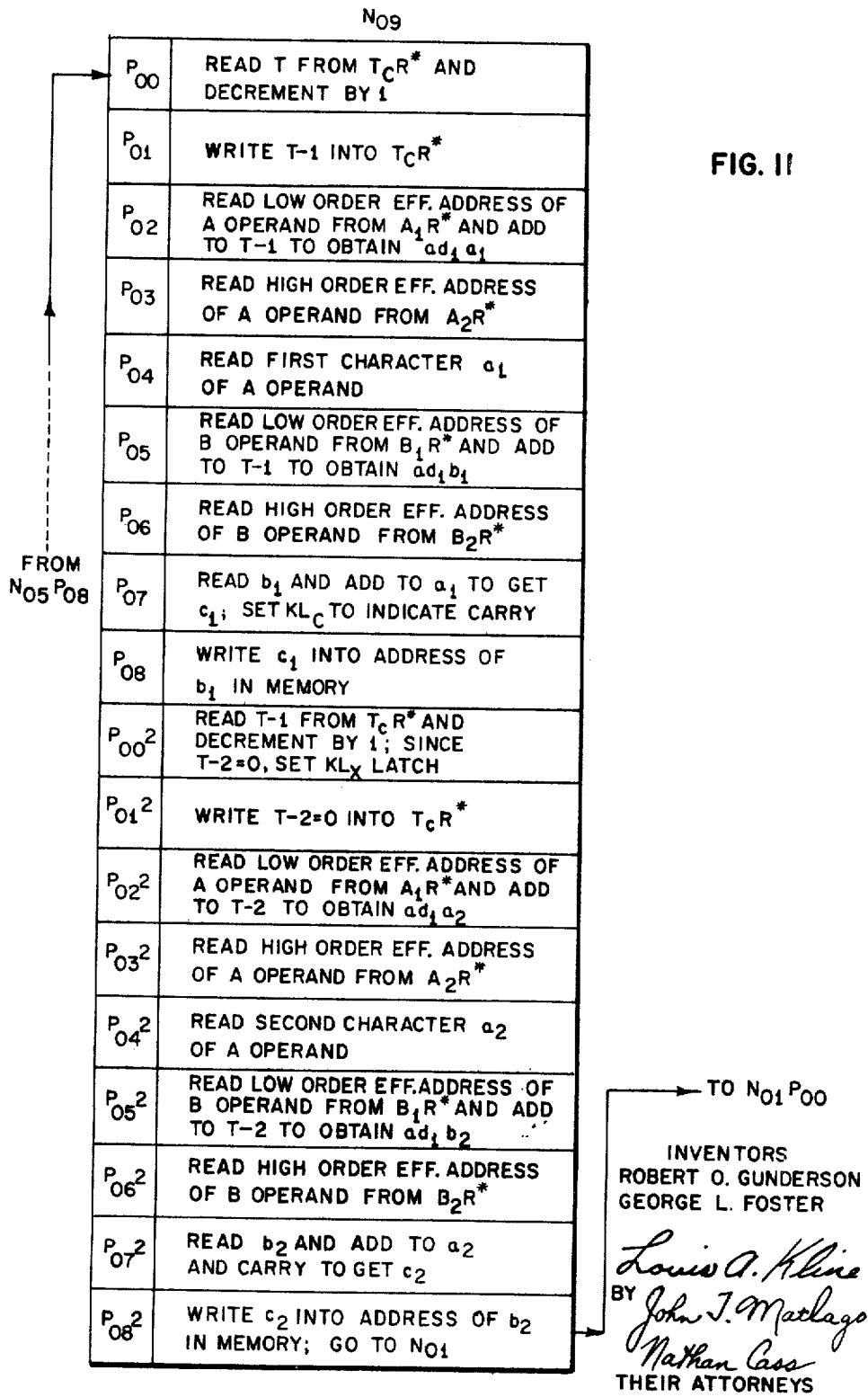

FIGS. 8–11 summarize the operations of the hardware of FIG. 4 during each of the basic cycles of FIG. 7; and FIGS. 12 and 13 are electrical circuit diagrams illustrating the logical circuitry used in forming the hardware components of FIG. 4 in general, and registers MA and LB in particular.

Like characters and symbols designate like elements throughout the description and the figures of the drawings.

INTRODUCTION

In order to provide a clear understanding of the present invention, a preferred embodiment thereof will be considered from a number of viewpoints and in an order which will best reveal the novel features and advantages of the invention.

First, an overall view of a preferred embodiment of a data processing system will be presented which will point out the approach of the system for performing data processing and the basic command format. Next, it will be shown how predetermined flow sequences of micro-commands are used to form commands. Then, the basic system hardware will be considered with particular reference to the operation during a basic cycle, and it will be explained how such basic cycles are combined to form micro-commands. Next, an example of hardware operation during the microcommands of a typical command will be presented to illustrate the details of system operation. Finally, detailed circuit descriptions of typical registers will be provided to illustrate preferred logical circuitry for forming the hardware components of FIG. 4. It is to be understood that the above descriptions to be provided are merely exemplary, and many modifications and additions are possible. The primary purpose of these descriptions is to provide a clear understanding of the invention which will permit those skilled in the art to practice the invention and achieve its objects and advantages. Accordingly, features and structure which are already known to those skilled in the art are not provided herein, or only provided in a general or exemplary manner, in order that the invention not be obscured by details which can readily be provided by those skilled in the art.

OVERALL VIEW AND COMMAND FORMAT

The preferred data processing system to be described herein is a synchronously operating machine in which the basic unit of timing is a periodically occurring basic cycle of typically 800 nanoseconds duration. As illustrated in the overall block diagram of the data processing system shown in FIG. 1, the system basically comprises an arithmetic and logic unit 5 (hereinafter referred to as ALU 5), controlled by a program control 15, and cooperating with a memory 12 and an operator console 20. ALU 5 includes an I/O logic portion cooperating with two sets of peripherals $X_1$–$X_n$ and $Y_1$–$Y_n$. The timing for the system is provided by a timing pulse generator 10.

Memory 12 is preferably a high speed random access thin film magnetic rod memory of the type disclosed in the commonly assigned patent applications, Ser. No. 426,105, now Patent No. 3,426,328, filed Jan. 18, 1965, or Ser. No. 530,042, filed Feb. 25, 1966. Memory 12 may typically comprise 16,000 individually addressable characters, each typically containing eight information bits and one parity bit.

Figure 2:
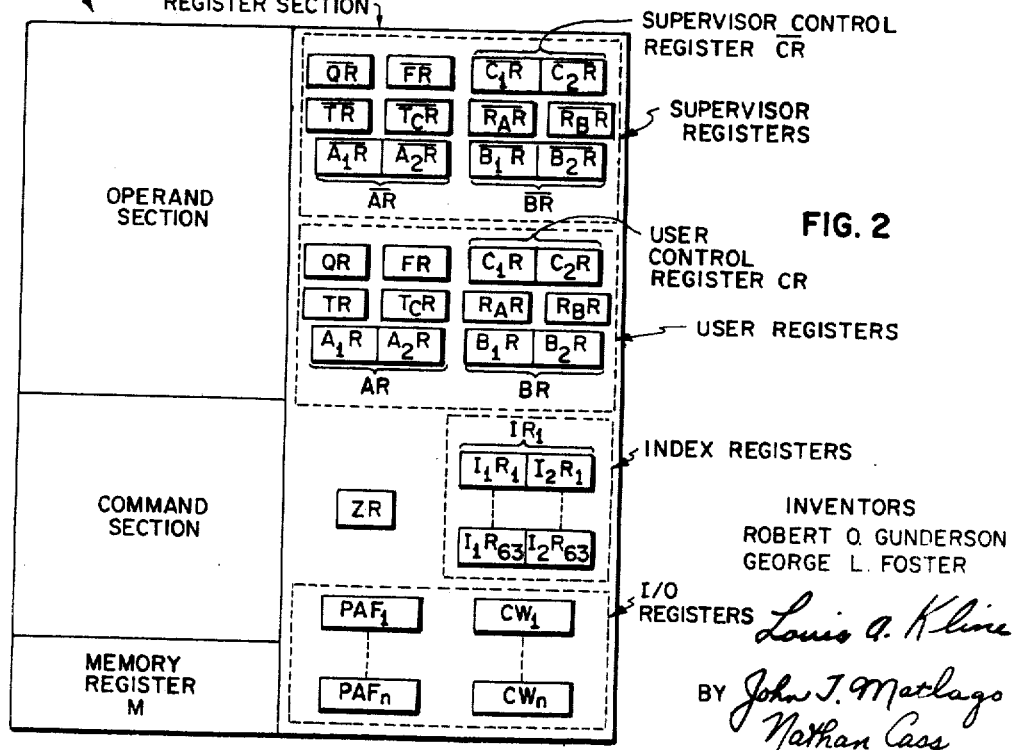
FIG. 2 is a block and schematic diagram of the memory used in the system of FIG. 1 showing the operand, command and register sections into which the memory is divided, and also showing various ones of the registers contained in the register section.

As indicated in FIG. 2, memory 12 not only provides an operand section and a command section for the storage of data and commands, but also provides a register section to provide storage for working registers, control registers, index registers, flag registers, and input-output registers, thereby significantly reducing the number of registers which need be provided in ALU 5. For greater clarity, an asterisk "*" will be used throughout the description following each memory register symbol designation to indicate that the register is located in memory 12.

Considering the register section of memory 12 in FIG. 2 in more detail, it will be seen to include supervisor registers $\overline{QR}^*$, $\overline{FR}^*$, $\overline{CR}^*$, $\overline{TR}^*$, $\overline{T_CR}^*$, $\overline{R_AR}^*$, $\overline{R_BR}^*$, $\overline{AR}^*$ and $\overline{BR}^*$, user registers $QR^*$, $FR^*$, $CR^*$, $TR^*$, $T_CR^*$, $R_AR^*$, $R_BR^*$, $AR^*$ and $BR^*$, index registers $IR_1^*$ to $IR_{63}^*$, a repeat count register $ZR^*$, and I/O registers $PAF_1^*$ to $PAF_n^*$ and $CW_1^*$ to $CW_n^*$. It will be noted that, for each user register, there is a corresponding supervisor register having a like symbol designation; a bar is provided over each supervisor register symbol designation to differentiate it from the like symbol designation of its corresponding user register. Each supervisor register is located at an address in the register section of memory which is greater (or less) than the address of its corresponding user register by the same amount. For example, each supervisor register may be located at an address which is greater by 16 than the address of its corresponding user register.

The provision in memory 12 of a duplicate set of supervisor and user registers having a constant address difference relationship therebetween provides most important advantages with regard to the performance of supervisor operations (such as error checking or testing) during a command or between commands. A conventional way of providing for such supervisor operations is by the use of special means and/or procedures, whereby the working registers (which are normally not located in the memory) are cleared, and the user data therein is saved by being transferred to other storage means, thereby making these working registers available for use in performing the required supervisor operations. After the supervisor operations are completed, the saved (or corrected) data is transferred back to the working registers to permit user operations to continue. Since, in the present invention, memory 12 includes corresponding sets of supervisor and user registers having a constant address difference relationship therebetween, there is no need to clear the user registers for supervisor operations. All that need be done for supervisor operations is simply to provide for appropriately incrementing the use working register addresses by the constant address difference between the user and supervisor working registers. The supervisor working registers in memory 12 will then automatically be accessed by the system instead of the user working registers. The user data will thus be conveniently retained in the user registers not only for comparison and/or correction during supervisor operations, but also to permit the system to readily return to user operations when the supervisor operations are completed.

Further with regard to memory 12, for the sake of economy and simplicity, memory 12 is restricted to the performance of either a read-restore (read) or a clear-write (write) cycle with respect to one section of the memory at a time, and with respect to one character therein at a time, whereby access to a character whether in the same or different sections of the memory is on a serial basis. Input to and output from memory 12 are by way of memory registry M. Despite speed and other limitations which are normally to be expected when operand, command and register sections are all provided in the same memory on a serial access basis, as described above, the data processing system of the present invention, nevertheless, by novel design, is able to achieve a relatively high overall operating speed, multiple degrees of simultaneity, and considerable versatility and flexibility, and all at relatively low cost, as will become evident as the description progresses.

Now considering the command structure provided for the system, it will be understood that the system provides a family of commands, predetermined ones of which may be loaded into a command section provided in memory 12, and then automatically accessed by the system so as to permit a wide variety of data processing applications to be accomplished. The system of the present invention is particularly advantageous for batch processing applications where a low cost file capability is the major consideration, and for modest real-time applications, such as back-up or auxiliary data collection. Examples of typical commands which may be provided in the command set are PACK, UNPACK, IN-OUT, ARITHMETIC, MOVE, COMPARE, BRANCH, WAIT, REPEAT, etc.

In the preferred embodiment to be described, straightforward programability is provided using a command structure employing a two-addresss variable character length format. Most commands deal with two operands, but some require only one operand. A one-operand command is coded in a one-address mode. A two-operand command is capable of being coded in either a one-address or a two-address mode. These two modes are equivalent in action, since the system is designed to permit a one-address command to obtain the address and operand length of a second operand from a previously executed command. This capability is of considerable advantage, since, whenever an operand is successively referenced throughout a continuous string of commands, which is quite common, the operand length and address of the second operand need be established only once in the entire string. Thus, not only is a considerable savings in program space achieved because successive one-address commands may be "chained," but also, considerable savings in time are also achieved because a one-address command requires a shorter set-up time than a two-address command.

The basic command formats for a two-address command, which comprises eight characters, and a one-address command, which comprises four characters, are illustrated below.

Two-Address Command—$QR_A A_2 A_1 TR_B B_2 B_1$
One-Address Command—$QR_A A_2 A_1$ The meanings of the above symbols representing the characters making up each command are as follows:

Q is the command code and designates the type of command to be executed; Q also indicates whether the command is coded in one-address or two-address form.

$R_A$ designates whether indexing is to be performed and, if so, the address of an index register $IR^*$ (FIG. 2) whose contents are to be used to modify the partial address represented by characters $A_2 A_1$ so as to obtain the effective address of the first operand A; $R_A$ also designates whether indexing is to be performed, and if so, whether incremental indexing is additionally to be performed.

$A_2 A_1$ designates the partial address of the A operand; if the $R_A$ character indicates no indexing, then $A_2 A_1$ is the effective address of the A operand.

$R_B$ is identical to $R_A$, except that it pertains to a second operand (which will be designated operand B).

$B_2 B_1$ has the same meaning as $A_2 A_1$, except that it pertains to operand B.

T normally designates the character length of both the A and B operands in a command.

MICRO-COMMAND FLOW

Figure 1:
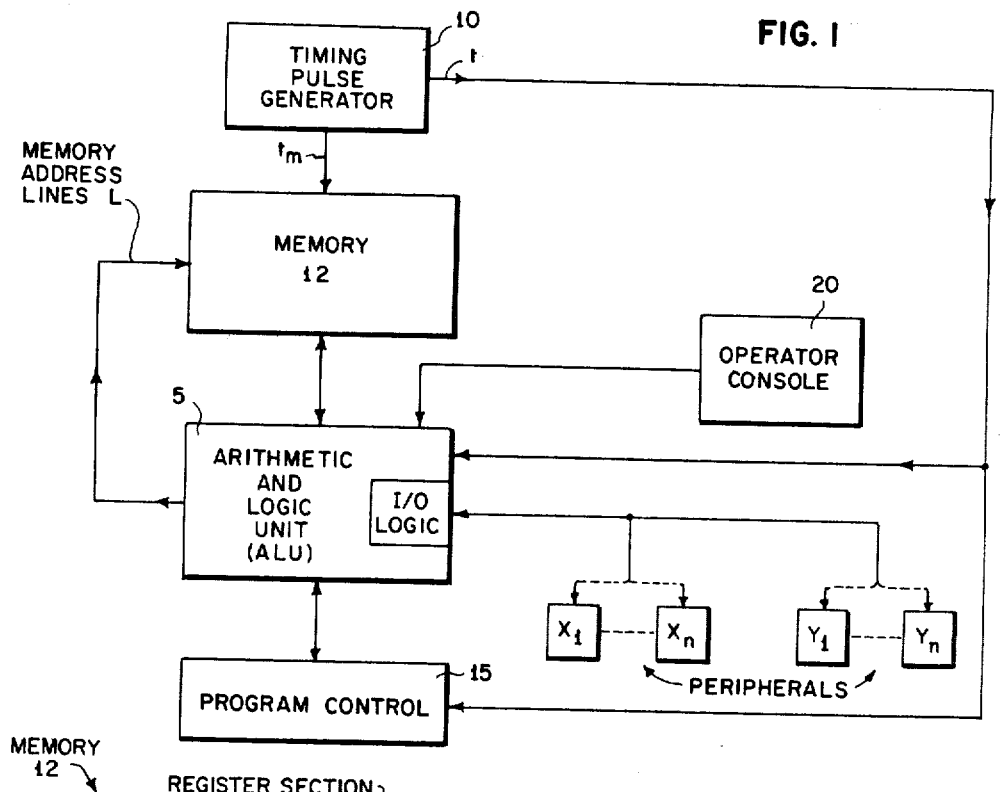

Each command is formed of a predetermined combination of particular micro-commands. In the preferred embodiment being described herein, any one of fourteen micro-commands $N_{00}$ to $N_{13}$ is capable of being provided by program control 15 (FIG. 1). These micro-commands are combined into micro-command flows in the manner illustrated in the micro-command flow chart of FIG. 3 to provide for the execution of the various commands provided by the system.

The execution of each command generally involves two distinct phases: (1) a command set-up phase involving micro-commands $N_{01}$ to $N_{05}$ during which the system operates to read out a specified command from the command section of the memory, derive the operand addresses, interpret the command to determine the type of operations to be performed, and preserve in respective registers in memory 12 the values required for executing the command; and (2) a command execution phase involving one or more of micro-commands $N_{00}$ and $N_{06}$ to $N_{12}$ in which the system performs the function specified by the command code Q on the appropriate operand or operands utilizing those preserved values which are pertinent to the command.

Micro-command $N_{13}$ is not involved in either command set-up or command execution phases, but is used in connection with the I/O logic portion of ALU 5 and can be inserted at the end of any other micro-command to permit the I/O logic to obtain access to memory 12 (FIG. 1). This is done by causing each micro-command, prior to its termination, to check whether an interrupt condition exists in the I/O logic; if so, the system will insert micro-command $N_{13}$ when the present micro-command terminates.

Micro-command flow during the command set-up and command execution phases will now be considered in more detail. For the sake of brevity, the function provided by each micro-command of checking for an interrupt condition to determine whether an in-out micro-command $N_{13}$ should be inserted is not mentioned in the following micro-command descriptions of the command set-up and execution phases, but it is to be understood that each micro-command includes this function and that an in-out micro-command $N_{13}$ can be inserted at the termination of any micro-command.

COMMAND SET-UP PHASE

Figure 3:
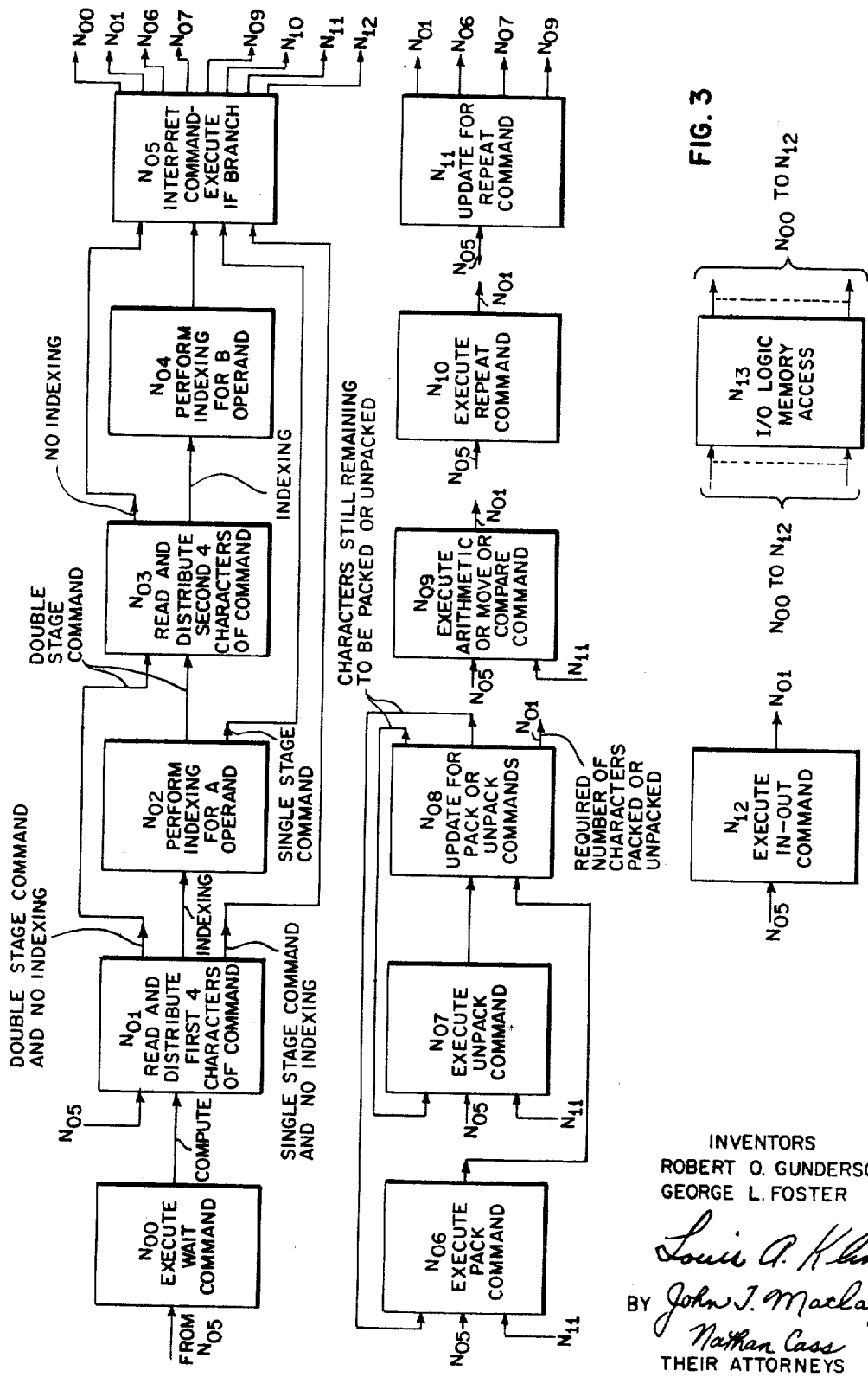
FIG. 3 is a diagram illustrating the micro-command flows used in forming the commands provided in the system of FIG. 1.

The command set-up phase involving micro-commands $N_{01}$ to $N_{05}$ is common to all commands and will now be considered in detail. As illustrated in FIG. 3, the micro-command flow between $N_{01}$ and $N_{05}$ is determined by whether Q indicates a one-address or a two-address command, and whether or not $R_A$ and/or $R_B$ indicate indexing. The following alternatives are possible.

(1) if Q indicates a one-address command, and:
(a) if $R_A$ indicates no indexing, the micro-command flow is from $N_{01}$ directly to $N_{05}$;
(b) if $R_A$ indicates indexing, the micro-command flow is from $N_{01}$ to $N_{02}$ to $N_{05}$;
(2) if Q indicates a two-address command, and;
(a) if both $R_A$ and $R_B$ indicate no indexing, the micro-command flow is from $N_{01}$ to $N_{03}$ to $N_{05}$;
(b) if both $R_A$ and $R_B$ indicate indexing, then the micro-command flow is from $N_{01}$ to $N_{02}$ to $N_{03}$ to $N_{04}$ to $N_{05}$;
(c) if $R_A$ indicates indexing and $R_B$ indicates no indexing, then the micro command flow is from $N_{01}$ to $N_{02}$ to $N_{03}$ to $N_{05}$;
(d) if $R_A$ indicates no indexing and $R_B$ indicates indexing, then the micro-command flow proceeds from $N_{01}$ to $N_{03}$ to $N_{04}$ to $N_{05}$.

Still referring to the micro-command flow diagram of FIG. 3, it will be understood that micro-commands $N_{01}$ and $N_{03}$ are basically similar in that they both involve reading out and distributing characters of a command, the difference being that $N_{01}$ operates on the first four characters $QR_AA_2A_1$ of a command, while $N_{03}$ operates on the second four characters $TR_BB_2B_1$. Similarly, micro-commands $N_{02}$ and $N_{04}$ are basically similar in that $N_{02}$ performs indexing, if required, for the first address of a command, while $N_{04}$ performs indexing, if required, for the second address of the command.

Operation during the command set-up phase will now be considered in more detail by examining operations occurring during each of micro-commands $N_{01}$, $N_{02}$, $N_{03}$, $N_{04}$ and $N_{05}$. It is to be understood that the descriptions which will be provided are merely illustrative of a typical embodiment, and many variations and additions are possible with in the scope of the invention. In particular, for greater simplicity of description, supervisor, testing, error, and like functions are not considered, or are only considered generally, but, in any case, may readily be provided by those skilled in the art in view of the description provided.

MICRO-COMMAND $N_{01}$

Micro-command $N_{01}$ begins the command set-up phase for all commands. As indicated in FIG. 3, micro-command $N_{01}$ may be entered from micro-commands $N_{00}$, $N_{08}$, $N_{09}$, $N_{10}$, $N_{11}$, $N_{12}$ or $N_{13}$. In micro-command $N_{01}$, the starting address of the command to be executed is read out from the two character registers $C_1R^*$ and $C_2R^*$ of which control register $CR^*$ is comprised (FIG. 2). If the system is in the supervisor state, the supervisor control register $\overline{CR}^*$ will be accessed instead of the user control register $CR^*$. By appropriate incrementing, ALU 5 uses the address read out of $CR^*$ to cause the first four characters $QR_AA_2A_1$ of the command to be serially read out of memory, each applied in turn to ALU 5, and then written back into memory 12 in respective memory registers $QR^*$, $R_AR$,$^*$ $A_2R^*$ and $A_1R^*$ (or the corresponding supervisor registers if the system is in the supervisor state). Unless stated otherwise, it will be assumed that the system is in the user state. Character Q upon being read out is examined by ALU 5 (FIG. 1) to determine whether the command is one-address or two-address. Character $R_A$ upon being read out is examined by ALU 5 to determine whether indexing is required. As will be apparent from the previously listed flow alternatives for the command set-up phase, the values of Q and $R_A$ determine the next micro-command. If $R_A$ indicates indexing, the next micro-command will be $N_{02}$; if $R_A$ indicates no indexing, the next micro-command is $N_{03}$ if Q indicates a two-operand command, or is $N_{05}$ if Q indicates a one-operand command.

MICRO-COMMAND $N_{02}$

Micro-command $N_{02}$ is entered from $N_{01}$ if $R_A$ indicates indexing is required. In micro-command $N_{02}$, $R_A$ and $A_2A_1$ are read out into ALU 5 (FIG. 1) from memory registers $R_AR^*$, $A_2R^*$ and $A_1R^*$ in which they were stored during $N_{01}$. $R_A$ is used to address a selected one of, for example, 63 2-character index registers IR* provided in memory 12. The contents of the selected memory index register are added to $A_2A_1$ and the sum, which is the effective address of the first or A operand, is written back into $A_2R^*$ and $A_1R^*$. $R_A$ is also used to indicate whether incremental indexing is additionally to be performed; if so, the sum of the contents of the selected index register and $A_2A_1$ is also written back into the selected index register IR*. The provision of such capability is advantageous in that it permits convenient updating of an index register for use in subsequent commands. After $N_{02}$, the next micro-command is $N_{03}$ if Q indicates a two-operand command is being executed, or is $N_{05}$ if Q indicates a one-operand command.

MICRO-COMMAND $N_{03}$

Micro-command $N_{03}$ is entered from $N_{01}$ if $R_A$ indicates no indexing, or from $N_{02}$ if indexing was required. Operation in $N_{03}$ is basically the same as that in $N_{01}$ except that the address in control register CR* is incremented by ALU 5 to cause the second four characters $TR_BB_2B_1$ of the command to be read out of the command section of memory 12 (FIG. 1), each applied in turn to ALU 5, and then written back into memory 12 in respective memory registers TR*, $R_BR^*$, $B_2R^*$ and $B_1R^*$ (FIG. 2) provided therein. Depending on whether or not $R_B$ indicates indexing, the next micro-command is $N_{04}$ or $N_{05}$.

MICRO-COMMAND $N_{04}$

Micro-command $N_{04}$ is entered from $N_{03}$ if $R_B$ indicates indexing is required. Operation in $N_{04}$ is basically the same as during $N_{02}$, except that $N_{04}$ performs indexing on $B_2B_1$ using an index register IR* selected by $R_B$, the sum of $B_2B_1$ and the contents of the selected index register being written in the same memory registers $B_2R^*$ and $B_1R^*$ where $B_2B_1$ were stored during $N_{03}$, and also in the selected index register if $R_B$ indicates incremental indexing is additionally to be performed. At the end of $N_{04}$, the micro-command flow proceeds to $N_{05}$.

MICRO-COMMAND $N_{05}$

Micro-command $N_{05}$ is entered from $N_{01}$, $N_{02}$, $N_{03}$ or $N_{04}$ depending on the values of Q, $R_A$, and $R_B$, as indicated in the descriptions of the previous micro-commands. The function of micro-command $N_{05}$ is to complete the command set-up phase for all commands, to examine and update flags in memory flag register FR*, to increment or alter the contents of control register CR* to the address of the next command, to transfer T in memory register TR* to tally counting register $T_CR^*$, and to perform other operations involved in preparing for the second or command execution phase of the present command being executed. A separate tally counting register $T_CR^*$ is provided in order to permit T to be retained in memory register TR* for use as the T value of the next command if it is of the one-address type. Micro-command $N_{05}$ also has the additional capability of performing the command execution phase for BRANCH commands, whereby BRANCH commands can be completed at the end of $N_{05}$, after which the micro-command flow returns to $N_{01}$ to begin the set-up phase for the next command. It will be understood that various types of BRANCH commands may be provided, such as BRANCH OVERFLOW, BRANCH LESS, BRANCH EQUAL, BRANCH LESS OR EQUAL, BRANCH GREATER, BRANCH LESS OR GREATER, BRANCH GREATER OR EQUAL, BRANCH UNCONDITIONALLY. Micro-command $N_{05}$ also provides for a transfer from the supervisor to the user state or vice versa, by permitting a supervisor latch to be set in response to, for example, the detection of a command error condition (a flag in flag register FR*); the setting of this supervisor latch will then cause address incrementing by the constant address difference between supervisor and user registers, whereby supervisor registers instead of user registers will be accessed during each micro-command as long as the supervisor latch is set.

In micro-command $N_{05}$, the command code Q is read out from memory register QR* (FIG. 2) in which it was stored during $N_{01}$ into ALU 5 for interpretation and use during the following command execution phase. Also, flags stored in memory flag register FR* (FIG. 2) are read out into ALU 5, interpreted and updated where appropriate, and then written back into the memory flag register FR*. Except for a WAIT command and a command repeat situation, the control register CR* in memory 12 is then read out into ALU 5, and its contents incremented or modified to the address of the next command to be executed. If a BRANCH command is being executed, this modification of the control register CR* completes the execution of the command.

As illustrated in FIG. 3, after $N_{05}$, the micro-command flow proceeds to : $N_{00}$ if Q indicates a WAIT command, $N_{01}$ if Q indicates a BRANCH command, $N_{06}$ if Q indicates a PACK command, $N_{07}$ if Q indicates an UNPACK command, $N_{09}$ if Q indicates an ARITHMETIC or MOVE or COMPARE command, $N_{10}$ if Q indicates a REPEAT command, $N_{11}$ if the repeat indicator flag indicates a command repeat situation, or $N_{12}$ if Q indicates an IN-OUT command.

COMMAND EXECUTION PHASE

It will be understood from the foregoing description that, at the end of the command set-up phase, Q, T, and the effective addresses of the A and B operands will have been stored in appropriate registers QR*, TR*, AR* and BR* (FIG. 2) in memory 12. If the command is one-address, the available values of T and B operand address will be that left in the respective TR* and BR* registers from a previous command.

As illustrated in FIG. 3, the micro-commands which may be entered to perform the command execution phase of a command following the previously described command set-up phase are $N_{00}$ and $N_{06}$ to $N_{12}$. Operations during each of these micro-commands will be illustrated by describing how they are used to execute various commands.

WAIT COMMAND

Micro-command $N_{00}$ is provided for execution of the WAIT command and also to permit performance of various miscellaneous functions, such as providing for testing, error checking, initial or halting conditions, and communication with the system input console. If micro-command $N_{00}$ is entered because of a WAIT command, a compute indicator is tested and if it is "on," the memory control register CR* is set to reference the next command and the flow proceeds to $N_{01}$. If the compute indicator is "off," the control register CR* is not modified and the flow does not proceed to $N_{01}$ until a compute button on the console is depressed. During the WAIT period, one or more in-out micro-commands $N_{13}$ can occur so as to permit peripherals to continue to have access to memory 12 (FIG. 1).

PAC COMMAND ($N_{06}$ AND $N_{08}$)

It will be remembered that a character contains 8 information bits in the preferred embodiment being described herein. Sometimes the system is working with characters containing only 4 bits, such as binary coded decimal data. In such a case, it may be desirable in order to economize storage space to pack two 4-bit characters into a single 8-bit information character. The PACK command is used for this purpose.

As illustrated in FIG. 3, if a PACK command is indicated by Q, the micro-command flow proceeds from micro-command $N_{05}$ to $N_{06}$, then to $N_{08}$, then loops back from $N_{08}$ to $N_{06}$ until the specific number of characters indicated by T are packed, and then returns to $N_{01}$ to access the next command, which is at the address contained in control register CR* which was appropriately modified during $N_{05}$. The flow may also enter $N_{06}$ from $N_{11}$ if the command is being repeated.

In micro-command $N_{06}$, a pair of adjacent memory characters at addresses derived from the contents of the AR* register (FIG. 2) are read out from the operand section of memory 12, combined by ALU 5 (FIG. 1) into a single 8-bit character, and the resulting 8-bit character then written back into the operand section of memory 12 at addresses derived from the contents of the BR* register (FIG. 2). The flow then proceeds to $N_{08}$.

The main purpose of micro-command $N_{08}$ is to modify the addresses in the AR* and BR* registers (FIG. 2) and decrement the contents of the TR* register in preparation for the next loop through $N_{06}$ if the contents of the TR* register indicate that there are still characters to be packed. This is done by reading out in turn the contents of the TR*, AR* and BR* registers, which are then appropriately incremented by ALU 5 and written back into the respective TR*, AR* and BR* registers in memory 12. If the decremented contents of the TR* register indicate that the required number of characters has been packed, then the PACK command terminates and the micro-command flow proceeds to $N_{01}$ to access the next command.

UNPACK COMMAND ($N_{07}$ AND $N_{08}$)

The UNPACK command is the opposite of the PACK command in that its purpose is to convert packed 4-bit characters back into 8-bit form; that is, to take each pair of 4-bit characters which are packed into a single 8-bit character and separate them into two 8-bit characters.

As illustrated in FIG. 3, if an UNPACK command is to be performed, the micro-command flow proceeds from micro-command $N_{05}$ to $N_{07}$, then to $N_{08}$, then loops back from $N_{08}$ to $N_{07}$ until the specific number of characters indicated by T are unpacked, and then returns to $N_{01}$ to access the next command. The flow may also enter $N_{07}$ from $N_{11}$ if the command is being repeated.

In micro-command $N_{07}$, an 8-bit character (containing two packed 4-bit characters) at an address derived from the contents of the AR* register (FIG. 2) is read out from the operand section of memory 12, separated by ALU 5 (FIG. 1) so as to comprise the least significant 4 bits of 2 adjacent characters are then written back into memory 12 at addresses derived from the contents of the BR* register. The flow then proceeds to $N_{08}$.

In micro-command $N_{08}$, operation is the same as for the previously described PACK command. That is, the addresses in the AR* and the BR* registers are modified and the contents of the TR* register decremented in preparation for the next loop through $N_{07}$ if the contents of the TR* register indicate that there are still characters to be unpacked. If the decremented contents of the TR* register indicate that the required number of characters has been unpacked, then the UNPACK command terminates and the micro-command flow proceeds to $N_{01}$ to access the next command.

MOVE, COMPARE AND ARITHMETIC COMMANDS ($N_{09}$)

Micro-command $N_{09}$ is provided for the purpose of executing ARITHMETIC, MOVE and COMPARE commands and, as illustrated in FIG. 3, is entered from $N_{05}$ if Q indicates any one of these commands. The micro-command flow then returns to $N_{01}$ to access the next command. The flow may also enter $N_{09}$ from $N_{11}$ if the command is being repeated.

Operation in micro-command $N_{09}$ differs depending upon whether an ARITHMETIC, MOVE or COMPARE command is to be performed. A description of operations in $N_{09}$ for each command is provided below.

MOVE command

In performing a MOVE command, characters in the operand section of memory 12 (FIGS. 1 and 2) at addresses derived from the contents of the AR* and $T_CR*$ registers are serially read out of memory 12 into ALU 5 (FIG. 1), and written back into the operand section of memory 12 at addresses derived from the contents of the BR* and $T_CR*$ registers. The contents of the $T_CR*$ register are decremented each time a character is moved and, when the $T_CR*$ register indicates that the required number of characters has been moved, the MOVE command terminates and the flow returns to $N_{01}$.

COMPARE command

In performing a COMPARE command, a first operand located at addresses derived from the contents of the AR* and $T_CR*$ registers (FIG. 2), and a second operand located at addresses derived from the contents of the BR* and $T_CR*$ registers are serially read out of the operand section of memory 12, compared by ALU 5 (FIG. 1), and the results of the comparison (e.g., whether A is equal to, less than, or more than B) written into the memory flag register FR*. The flow then proceeds to $N_{01}$ to access the next command.

ARITHMETIC command

In performing an ARITHMETIC command, a first operand located at addresses derived from the contents of the AR* and $T_CR*$ registers (FIG. 2), and a second operand at addresses derived from the contents of the BR* and $T_CR*$ registers, are serially read out of the operand section of memory 12 and applied to ALU 5 (FIG. 1). ALU 5 performs an arithmetic operation on each pair of corresponding characters of the two operands, the particular arithmetic operation (such as add, subtract, etc.) being determined by Q. The results of the arithmetic operation are written back into the memory addresses occupied by the second operand. The micro-command flow then proceeds to $N_{01}$ to access the next command. It will be understood that various types of ARITHMETIC commands may be provided, such as ADD UNSIGNED, SUBTRACT UNSIGNED, ADD BINARY and SUBTRACT BINARY.

REPEAT COMMAND ($N_{10}$ AND $N_{11}$)

The REPEAT command involves micro-commands $N_{10}$ and $N_{11}$ and is provided to permit the system to execute a command a predetermined number of times.

When a command is to be repeated, a REPEAT command is inserted in the program preceding the command to be repeated in order to prepare the system for the repeating operation, whereupon the flow enter $N_{10}$ after $N_{05}$. In $N_{10}$, the repeat count number is read out from the address designated by AR* (FIG. 2), stored in a repeat counter register ZR* in memory 12 and, if the repeat count number is not zero, indicating repeating is to occur, the repeat indicator flag is set accordingly and stored in memory flag register FR*, after which the REPEAT command terminates and the flow proceeds to $N_{01}$ so as to permit the next following command (which is the one to be repeated) to be access. When the flow for the new command reaches $N_{05}$, a check of the repeat indicator in flag register FR* will indicate a repeat command condition, causing the flow to proceed to $N_{11}$ before proceeding to the corresponding micro-command of the command being executed.

In $N_{11}$ the repeat counter register ZR* (FIG. 2) is read out and decremented by 1. If the contents of ZR* indicate this is the last time the command is to be repeated, $N_{11}$ also causes the repeat indicator flag in flag register FR* to be turned off and the control register CR* updated so as to cause the next command to be accessed when the flow returns to $N_{01}$ at the completion of the present command. As long as the decremented value in ZR* continues to indicate a repeat command situation, the control register CR* remains unchanged and the repeat indicator flag remains set to cause the same command to again be accessed in $N_{01}$ and another repeating of the command to occur after the flow leaves $N_{05}$.

IN-OUT COMMAND ($N_{12}$)

The IN-OUT command, like other commands, is performed on-line and is executed in micro-command $N_{12}$ which the flow enters from $N_{05}$ if Q indicates an IN-OUT command. The purpose of the IN-OUT command is to initiate selection of a particular peripheral unit, initiates off-line control thereof by the I/O portion of ALU 5, and, in response to data received from the selected peripheral, store a status signal in memory 12 indicating the status of the peripheral unit. The command then terminates, and the flow proceeds to $N_{01}$ to access the next command. Micro-command $N_{12}$ accomplishes these functions by reading out the contents of the AR* register (FIG. 2) from which address of PAF* register (FIG. 2) in memory 12 are derived corresponding to the peripheral to be selected. The PAF word in the selected PAF* register is serially read out of memory 12 and transmitted via the I/O portion of ALU 5 to a selected peripheral to initiate selection thereof. The selected peripheral responds to the PAF word by sending back data which indicates the status thereof (such as busy, standby, command initiated). This status data is recorded in a respective control word register CW* (FIG. 2) in memory 12 located at addresses derived by reading out the contents of memory register BR*, after which the command terminates and the flow proceeds to $N_{01}$ to access the next command. Other peripherals may have been similarly selected by other IN-OUT commands, so that a number of peripherals may be in a selected condition at the same time.

I/O OPERATIONS ($N_{13}$)

As indicated in the description of the IN-OUT command, one of the functions of the IN/OUT command is to initiate operation of the I/O logic portion of ALU 5 (FIG. 1) with respect to a selected peripheral, whereupon the I/O logic then takes over the burden of handling various off-line peripheral operations, such as recognizing peripheral request signals and preparing for data transfer, thereby permitting the system to execute other commands without being hampered by such functions. The I/O logic is able to perform its operations simultaneously with any of microcommands $N_{00}$ to $N_{12}$ as long as the I/O logic does not require access to memory 12 (FIG. 1). When the I/O logic requires memory access (for example, because a peripheral is ready for data transfer), an interrupt condition of the I/O logic occurs which, as mentioned previously, is examined by ALU 5 prior to the termination of each of micro-commands $N_{00}$ to $N_{12}$. If an interrupt condition is found to be present, the normal flow is interrupted at the end of the current micro-command and an I/O logic micro-command $N_{13}$ is inserted to permit a character to be transmitted from ALU 5 to the selected peripheral, or vice versa, after which the normal flow continues from the point of interruption. Of course, the peripherals and the I/O logic must be appropriately chosen in conjunction with system operation so as to provide a maximum rate of interruption consistent with the speed of data processing required by the system. It will be understood that such operations of the I/O logic, as described above, provide the system with multiple degrees of simultaneity.

Now considering the I/O logic micro-command $N_{13}$ more specifically, operations during $N_{13}$ are such as to permit the I/O logic to obtain access to memory 12 for peripheral data transfer and/or updating I/O control information stored in memory 12. The peripheral requesting access provides a response number to the I/O logic from which the address of its respective memory control word register CW* is derived. The control word in the respective control word register indicates the status of the peripheral, the address in memory 12 which is to be accessed, and whether a character is to be transmitted from memory 12 to the selected peripheral, or vice versa. The selected transfer between memory 12 and the selected peripheral, via the I/O logic then takes place, and the respective control word register CW* is appropriately updated so that the proper character is transferred each time the peripheral is selected, the transfer operation terminates when the desired number of characters has been transferred.

SYSTEM HARDWARE

From the foregoing description, it should be evident how a family of commands providing considerable capability and flexibility for a wide variety of applications may be generated and executed by the provision of the micro-command flow illustrated in FIG. 3 using the relatively few micro-commands $N_{00}$ to $N_{13}$. There are, of course, many possible ways of implementing these micro-commands from a hardware viewpoint. However, in a data processing system, it is important not only to provide a high processing capability, but also, to provide high speed operation as well as minimum system cost. Thus, it is the combination of the capability provided by the micro-command flow taken in conjunction with the cost and speed of operation of the required implementing hardware which are important measures of the overall merit of a data processing system. It is in providing a high overall figure of merit that the present invention is particularly advantageous.

The manner in which the present invention achieves a high capability micro-command flow has already been described. It will now be described in connection with FIGS. 4–11 how this micro-command flow is implemented by hardware which is remarkably simple and economical in view of the micro-command capability provided thereby, and also provides a high speed of operation.

Before considering FIG. 4 in detail, some initial points will first be made. It is to be noted with regard to FIG. 4 that well known block and schematic representations are used therein, since the novelty with respect to the hardware resides chiefly in the novel combination and cooperation between the well known components illustrated in FIG. 4. Representative examples of the detailed circuitry used in forming the hardware components will be considered later on herein in connection with FIGS. 12 and 13.

It is also to be understood that each block or schematic representation in FIG. 4 includes appropriate circuitry conventionally associated therewith which may be desired or required for achieving the functions described therefor in the description. While the detailed circuitry making up the components illustrated in block form in FIG. 4 may take various conventional forms, for the sake of the economies obtainable by standardization, all of the registers, gates and other logical circuitry in the system are preferably chosen so as to be capable of being formed from combinations of a single basic NAND circuit of the type disclosed in the commonly assigned copending patent application, Ser. No. 505,477, now Patent No. 3,411,052 filed Oct. 28, 1965.

It will further be understood with regard to FIG. 4 that, for greater clarity, common groups of lines emanating from the same component are bracketed together into a single line having the same designation as the logical circuit, such as lines $P_{00}$ to $P_{10}$ in FIG. 4, emanating from program counter P, which are bracketed into the single line P. When such a single line is applied to a component, it normally indicates that all (but at least one, in any case) of the lines represented thereby are applied thereto. Also, for convenience of reference, lines will be referred to by the same designation as the signals they represent, and will have designations similar to the component from which derived. For example, designations $P_{00}$ to $P_{10}$ in FIG. 4 refer to both the signals and lines emanating from program counter P.

It will further be understood with regard to FIG. 4 that timing pulse generator 10, memory 12, program control 15, I/O logic, and peripherals $X_1$–$X_n$ and $Y_1$–$Y_n$, correspond to like numbered components in FIG. 1. ALU 5 of FIG. 1 is constituted in FIG. 4 by address registers LA–1, LA–2 and LB, data registers MA and MB, adder J, control logic K, address logic H, and I/O logic. As indicated in FIG. 4, timing pulse generator 10 is preferably of the delay line type disclosed in Patent No. 3,223,980, issued December 14, 1965, in which an oscillator 20 periodically applies pulses to a lumped constant or distributed delay line 22 having amplifier-shaper circuits 23 provided at appropriate points therealong, with timing pulse output $t_m$ and $t$ being provided by delay line taps connected to appropriate pulse forming circuits 24. As mentioned previously, memory 12 is preferably a high speed thin film rod memory of the type disclosed in the aforementioned copending patent applications, Ser. No. 425, 105, now Patent No. 3,426,328 filed Jan. 18, 1965, or Ser. No. 530,042, filed Feb. 25, 1966.

Figure 5:
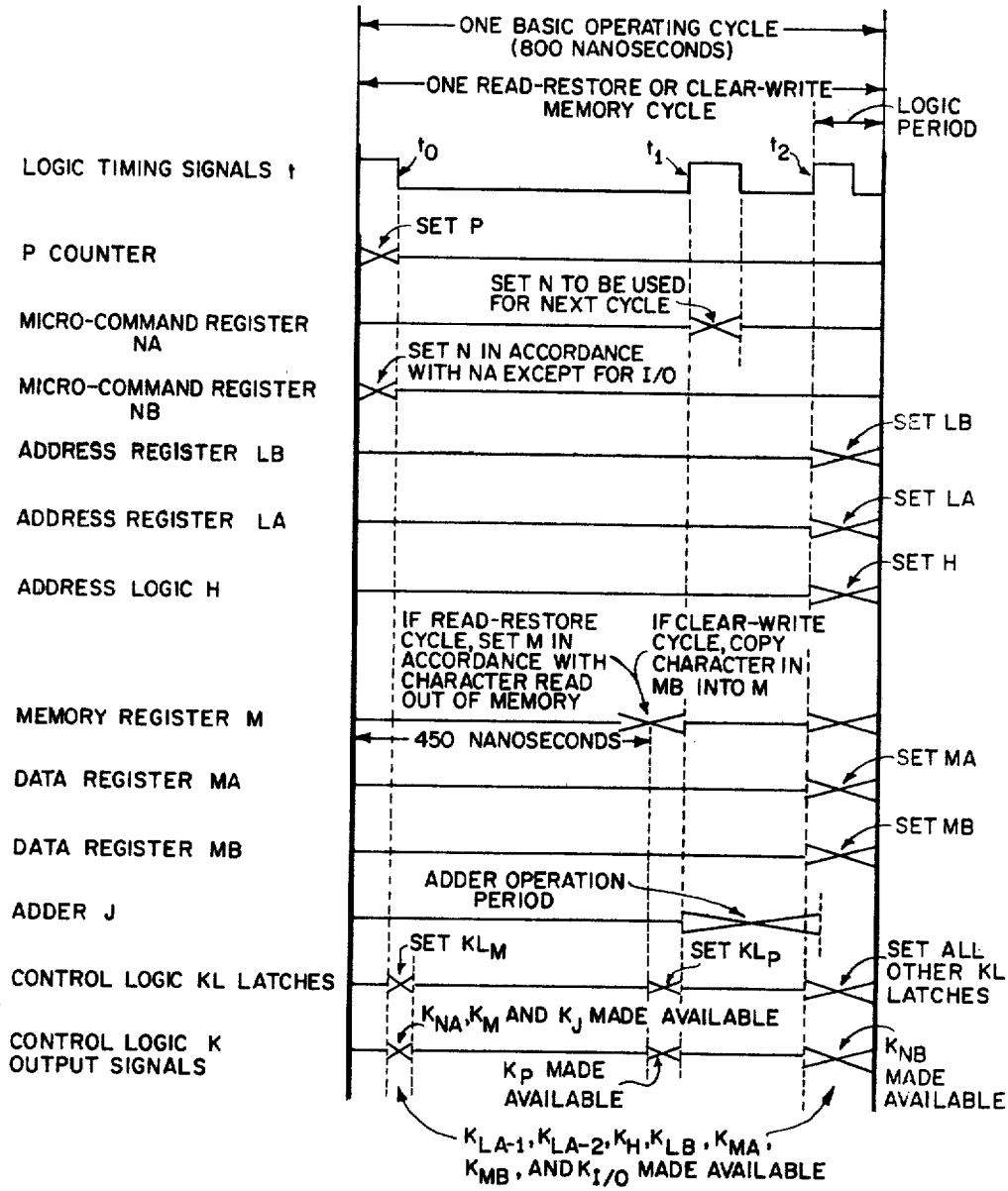
FIG. 5 is a series of graphs illustrating timing relationships of the hardware of FIG. 4 during a basic cycle of operation.

Now referring to FIG. 4 with the aid of the timing graphs of FIG. 5, it will be understood that oscillator 21 of timing pulse generator 10 is chosen in conjunction with delay line 22 and the delay line taps thereon to provide a synchronously occurring 800 nanosecond basic operating cycle for the system during which timing pulses $t_m$ are produced for controlling the timing of memory 12 to provide one read-restore or clear-write memory access during each basic cycle, and logic timing pulses $t_0$, $t_1$ and $t_2$ (graph $t$ in FIG. 5) are produced for controlling the timing of logical operations occurring during each basic cycle. Since each 800 nanosecond basic cycle is also a memory cycle, pulse generator 10 is simplified in that as illustrated in FIG. 4, a single delay line 22 can be used to provide both memory and logic timing pulses, rather than a plurality of delay lines as required, for example, in the computer system disclosed in the aforementioned Patent No. 3,223,980.

A variable plurality of these basic 800 nanosecond cycles illustrated in FIG. 5 are used in forming each of the micro-commands $N_{00}$ to $N_{13}$ in FIG. 3. The particular memory and logical operations to be performed during each basic cycle are determined by program control 15 (FIGS. 1 and 4) which provides one of fourteen micro-command control signals $N_{00}$ to $N_{13}$ to indicate the micro-command involved, and one of eleven sequentially occurring program counter signals $P_{00}$ to $P_{10}$ to indicate a particular count of the selected micro-command. A selected one of each of these N and P signals is selected by program control 15 during timing pulse $t_0$ at the beginning of each cycle (graphs NB and P in FIG. 5), and these are applied to control logic K in FIG. 4 which, in response thereto, produces output signals K which are fed to the hardware components to control the operation thereof, whereby to cause the required operations to be performed during each basic cycle. Since program control 15 is capable of selecting during each basic cycle one of fourteen micro-command signals $N_{00}$ to $N_{13}$ and one of eleven program counter signals $P_{00}$ to $P_{10}$, any one of a total of $14 \times 11 = 154$ combinations may occur during each basic cycle to determine the operations to be performed during that cycle. For example, if program control 15 selects a micro-command signal $N_{05}$ and a program counter signal $P_{02}$ during timing pulse $t_0$ at the start of a basic cycle, this would indicate that the system is set up during this basic cycle to perform the memory and logical operations required for count $P_{02}$ of micro-command $N_{05}$. It will thus be evident that the program control approach of the invention provides the significant advantage of having to select only two of twenty-five program control signals (fourteen micro-command signal $N_{00}$ to $N_{13}$ and eleven program counter signals $P_{00}$ to $P_{10}$) in order to set up the system to perform any of the 154 operations capable of being performed during a basic cycle, rather than providing 154 unique program control signals for this purpose as is done in other systems.

Considering program control 15 in FIG. 4 in more detail, it will be seen to comprise two micro-command registers NA and NB, a program counter P, and decoders 16 and 18 for decoding the outputs of register NB and counter P, respectively, to provide respective program control output signals $P_{00}$ to $P_{10}$ and $N_{00}$ to $N_{13}$.

Registers NA and NB in FIG. 4 are settable during timing pulses $t_1$ and $t_0$, respectively, in accordance with respective program decision signals $K_{NA}$ and $K_{NB}$ (see also FIG. 5) applied thereto from control logic K. An X in FIG. 5 indicates a period during which a setting or change can occur, or, in the case of control logic K output signals, the period during which these signals become available for use. It is to be understood that program decision signals $K_{NA}$ and $K_{NB}$, like other signals from control logic K, may each comprise one or more signals as necessary to provide the input data required by the respective component to which applied.

With reference to FIGS. 4 and 5, it will now be described how registers NA and NB operate in response to program decision signals $K_{NA}$ and $K_{NB}$ to control the micro-command flow, including the insertion of an I/O micro-command. Program decision signals $K_{NA}$ cooperate with register NA to provide two possible types of operation: (1) if $K_{NA}$ indicates that the cycle being performed is the last cycle of a micro-command, then $K_{NA}$ causes timing pulse $t_1$ to set NA to the next micro-command indicated by $K_{NA}$; and (2) if $K_{NA}$ indicates that the cycle being performed is not the last of a micro-command, or if $K_{AN}$ indicates the cycle is the last of an I/O micro-command $N_{13}$, then $K_{NA}$ causes the setting of register NA to remain unchanged. Decision logic signals $K_{NB}$ cooperate with register NB to provide three possible types of operation: (1) if $K_{NB}$ indicates the cycle being performed is the first cycle of a micro-command and if the micro-command is other than I/O micro-command $N_{13}$, then $K_{NB}$ causes NB to copy NA during timing pulse $t_0$; (2) if $K_{NB}$ indicates the cycle being performed is not the first cycle of a micro-command, $K_{NB}$ causes the setting of NB to remain unchanged; and (3) if $K_{NB}$ indicates the cycle being performed is the first cycle of an I/O micro-command, $K_{NB}$ does not cause NB to copy register NA at $t_0$, but instead, causes NB to be set to I/O micro-command $N_{13}$.

It will be understood from the foregoing description of the operation of program control registers NA and NB how, in response to program decision signals $K_{NA}$, $K_{NB}$ and $K_P$, particular N and P values are selected during timing pulse $t_0$ at the beginning of each cycle (graphs NB and P in FIG. 5), how micro-commands are sequenced, and how an I/O micro-command can be inserted at the end of a micro-command. It will also be understood how the micro-command flow can continue from the point of interruption after completion of an I/O micro-command, since register NA will have retained therein the next micro-command, which will be copied into register NB at timing pulse $t_0$ of the cycle following the last cycle of the I/O micro-command.

Next to be considered is program counter P in FIG. 4 which, in response to timing pulse $t_0$ and program decision signal $K_P$ from control logic K, and in cooperation with decoder 18, selects one of program counter signals $P_{00}$ to $P_{10}$ in order to indicate during each cycle the particular count of the selected micro-command in micro-command register NB which is to be performed during that cycle. In order to simplify the design of program counter P, the capability of program counter P is restricted to sequential counting (i.e., $P_{00}$, $P_{01}$, $P_{02}$, $P_{03}$, etc.) in response to each timing pulse $t_0$ (FIG. 5), with the relatively simply providable additional capability of being resettable to its initial count $P_{00}$ at the completion of any other count when such resetting is indicated by program decision signal $K_P$ applied thereto. The P counting will then start over again from $P_{00}$, either for the same N micro-command (such as may occur when looping back is provided for a micro-command), or for a new micro-command. A micro-command may thus comprise a greatly variable plurality of cycles so as to permit a micro-command to be terminated at the end of any program count as soon as the operations required for the micro-command have been completed, thereby permitting speeding up of the micro-command flow whenever possible, while keeping program counter P structurally simple.

Having explained how program control 15, in co-operation with program signals $K_{NA}$, $K_{NB}$ and $K_P$ from control logic K, provides for the sequencing of micro-commands and the selection of a unique combination of N and P signals for each basic cycle, the operation of the other hardware of FIG. 4 during each basic cycle will now be considered. In order to provide a full and complete understanding of the invention, this hardware description will conclude with a detailed description of the cooperative operation between all of the various hardware components during the counts and micro-commands involved in the performance of a typical command, whereby a full appreciation of the hardware construction and operation will be obtained.

Figure 6:
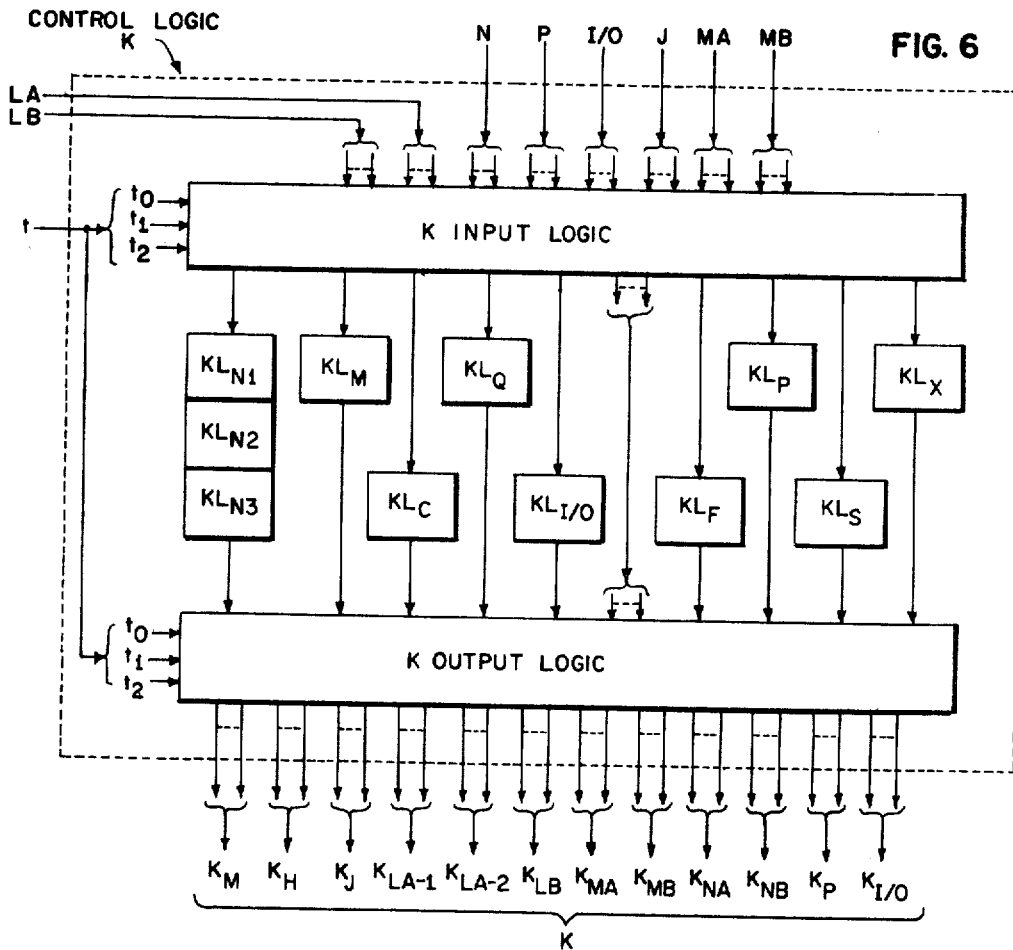
FIG. 6 is an electrical block diagram showing details of the control logic K of FIG. 4.

As illustrated in FIGS. 4 and 6, the program control N and P signals are applied to control logic K along with the output of address registers LA and LB, data registers MA and MB, adder J, logic timing signals $t$ and I/O signals from the I/O logic. It will be understood from FIG. 6 that control logic K includes K input logic for logically combining the N, P, J, I/O, LA, LB, MA and MB inputs, KL latches responsive to the K input logic, and K output logic responsive to the KL latches and the K input logic for producing output signals $K_{NA}$, $K_{NB}$, $K_P$, $K_{LA-1}$, $K_{LA-2}$, $K_{LB}$, $K_H$, $K_{MB}$, $K_{MA}$, $K_M$, $K_J$ and $K_{I/O}$ which are applied to respective hardware components for use in controlling the operation thereof during each cycle.

For this part of the description, a consideration of just the control logic K output signals will be sufficient to provide an understanding of the hardware structure and operation. The specific design and operation of the K input and output logic and each of the KL latches will become evident from this description taken in conjunction with the detailed description of the hardware operation during the performance of a typical command, and the description of the details of typical registers which will be presented later on herein. It will be noted with respect to the control logic K outputs that, for convenience of identification, the subscripts thereof have been chosen to correspond to the hardware components to which applied, and, as mentioned previously, each K signal (e.g., $K_{NA}$ applied to micro-command register NA) may comprise one signal or a set of signals on one or more lines, as required to provide the described opeartion of its respective component during each cycle. The control logic K latches and the K input and output logic may be of conventional form, but preferably are formed using combinations of the NAND circuit disclosed in the aforementioned patent application, Ser. No. 505,477.

As illustrated in FIG. 5 control logic output signals $K_P$ and $K_{NB}$ are made available during the logic period so as to be available for use in setting program counter P and register NB during $t_0$ of the next cycle, while control logic output signals $K_{NA}$, $K_M$, $K_J$ are made available shortly following timing pulse $t_0$ so as to be able to be responsive to the newly set N and P values; control logic output signals $K_{LA-1}$, $K_{LA-2}$, $K_{LB}$, $K_{MA}$, $K_{MB}$ and $K_{IO}$, are made available either shortly following $t_0$, or at the logic period at the end of the cycle, or, if a K signal includes a plurality of signals, part can be made available at one time and part at the other.

Now considering memory 12, it was previously pointed out that a memory cycle occurs during each 800 nanosecond basic cycle during which either a read-restore or clear-write memory cycle may be performed. The particular memory cycle is determined by memory conrtrol signals $K_M$ (see also FIG. 5) applied to memory 12 from control logic K. If $K_M$ indicates a read-restore memory cycle is to be performed, memory 12 operates to cause a character at an address selected by memory address lines L to be read out of memory 12 and set up in memory register M at about 400 nanoseconds in the basic cycle (graph M in FIG. 5); during the remainder of the cycle, the character read out is automatically restored, via the M register, back into the selected address. If $K_M$ indicates a clear-write memory cycle is to be performed, operation of memory 12 is similar to that of a read-restore cycle, except that the charatcer read out of memory 12 is not set up in memory register M; instead, the character to be written into the selected memory address is copied from data register MB into memory register M at about 400 nanoseconds of the cycle, and it is this new character which is written into the selected memory address during the remainder of the cycle.

As illustrated in FIG. 4, the memory address applied to memory address lines L is obtained from either address register LA (LA-1 and LA-2 taken together), or from address register LB, depending upon the state of logic circuit H. Address register LA is used to address command and operand section of memory 12 (FIG. 2), while address register LB is used to address the register section of memory 12. As illustrated in the graphs of FIG. 5, address registers LA and LB and address logic H are each settable during the logic period provided at the end of each cycle in response to respective input signals applied thereto, the resulting settings determining the memory addressing for the next cycle. As indicated in FIG. 4, address register LA is responsive to address control signals $K_{LA}$ and the output of adder J, address register LB is responsive to address control signals $K_{LB}$ and the output of program control register NA, and logic circuit H is responsive to control signals $K_H$. The manner in which the respective inputs to LA, LB and H cooperate during the performance of a micro-command will become evident when a specific micro-command is described later on herein.

Still referring to FIG. 4, it will be seen that the character read out of memory 12 into the M register as a result of a read-restore cycle is applied to one input of adder J where, depending on adder control signals $K_J$ applied thereto, it may be added (or subtracted, or compared) with respect to a character applied to another input of adder J obtained from either MA or MB data registers, or with O (if merely a transfer through the adder J is desired). The resulting output of adder J is capable of being applied to any one or more of registers LA–1, LA–2, MA, MB, and/or control logic K.

As indicated in the timing graphs of FIG. 5, adder J begins its operation at the beginning of timing pulse $t_1$, by which time the memory has completed its operation, whereby a character read out from memory 12 is available for logical combination in adder J with a character from register MA or MB (or zero). Adder J completes its operation shortly after the start of timing pulse $t_2$, whereupon the adder output J may be applied to control logic K, or to one or more of registers MA, MB, LA-1, or LA-2 for use in setting thereof during the logic period initiated by $t_2$. It is to be understood that, in order to reduce hardware costs, one or more of the above registers and circuits as well as one or more of the control logic latches KL may be of the type which require a clearing operation prior to each setting operation. In such a case, timing pulse $t_1$ is used for this purpose. The components in FIG. 4 using such latches are indicated by having timing pulse $t_1$ applied thereto in addition to $t_2$. To provide appropriate operation of these components the respective control logic K signal applied thereto will provide for clearing $t_1$ if the component is to receive new information during the logic period; otherwise, $t_1$ will have no effect.

Address registers LA and LB and data registers MA and MB will now be considered in more detail. As mentioned previously, address register LA serves to address command and operand sections of memory 12 (FIG. 2), while address register LB is used to address the register section of memory 12, the particular address register to be used during a basic cycle being determined by the setting of logic circuit H. With regard to address register LB, operation thereof is such that, when address control signals $K_{LB}$ indicate that the present cycle is to be the last of the micro-command currently being performed, $K_{LB}$ will cause register LB to obtain the appropriate memory register address for use in the first count $P_{00}$ of the next following micro-command by decoding control signals N and P which, as pointed out previously, will have been set in accordance with the next micro-command during the immediately preceding timing pulse $t_1$ (FIG. 5). The only exception occurs if, as a result of the I/O logic communicating an interrupt condition to control logic K, address control signals $K_{LB}$ are than caused to indicate that the next micro-command is to be an I/O micro-command $N_{13}$. In such a case, $K_{LB}$ will contain the appropriate memory address required in the first count of the I/O micro-command, and address register LB will be set in accordance therewith, rather than in accordance with register NA. Because of the provision of such operation of LB as described above, a clearing type operation as provided for LA is not provided for LB, and a change from one setting of LB to another setting occurs only during the logic period. As will become more evident when the details of register LB are considered later on herein in connection with FIG. 13, control signals $K_{LB}$ applied thereto permit register LB to address either the supervisor or user registers in memory 12 (FIG. 2), depending upon the state of supervisor latch $KL_S$.

With regard to data register MA in FIG. 4, it is a one character register and, like LA, is of the type requiring clearing during $t_1$. MA is usable for temporary data storage, and also serves to hold the command code Q while it is being decoded. Preferred logical circuitry for use in forming register MA is illustrated in FIG 12, and will be considered later on herein.

As for data register MB, like register MA, it is of one character length and is of the clearing type. Besides being usable for data storage, MB also serves to hold a new character for application to memory register M for writing into memory 12 during a clear-write cycle, may additionally serve as an I/O buffer between the I/O logic and memory 12 and as an input register from the operator console 20, and has the further capability of being able to modify individual bits of a character stored therein during the logic period in response to control signals $K_{MB}$ for the purpose of setting flags. As illustrated in FIG. 4, data input to register MB is from adder J, console 20, and the address register LB is used to address the register section of memory 12, the particular address register to be used during a basic cycle being determined by the setting of logic circuit H. Address register LA is shown in two parts as register LA-1 and LA-2 because 2 characters are required in order to be able to address all of the characters in the command and operand sections of the memory, LA-1 being loaded with one character of the address and LA-2 with the other. Both parts LA-1 and LA-2 are of the type which requires clearing during $t_1$ if new information is to be set therein during the logic period.

With regard to register LB which is used to address the register section of memory 12, since all of the characters in the register section of memory 12 can be addressed by a single character, address register LB need only be one character in length. Further, with regard to address register LB, operation thereof is such that, when address control signals $K_{LB}$ indicate that the present cycle is to be the last of the micro-command currently being performed, $K_{LB}$ will cause register LB to obtain the appropriate memory register address for use in the first count $P_{00}$ of the next following micro-command by decoding the output of micro-command register NA which, as pointed out previously, will have been set in accordance with the next micro-command during the immediately preceding timing pulse $t_1$ (FIG. 5). The only exception occurs if, as a result of the I/O logic communicating an interrupt condition to control logic K, address control signals $K_{LB}$ are then caused to indicate that the next micro-command is to be an I/O micro-command $N_{13}$. In such a case, $K_{LB}$ will contain the contain the appropriate memory address required in the I/O logic, and data output from MBB is to the I/O logic and to an input of adder J, control being provided by control signals $K_{MB}$ from control logic K.

The remaining portion of FIG. 4 to be considered is the I/O logic and peripherals $X_1$ to $X_n$ and $Y_1$ to $Y_n$ cooperating therewith. The transfer of data and control signals between the I/O logic and the X and Y peripherals is provided by way of a common trunk which comprises data and control lines 30 cooperating with the X and Y peripherals, and selection lines 40 which are used during the IN-OUT micro-command $N_{12}$ for the selection and initial control of a peripheral. The advantage of having selection lines 40 separate from the data and control lines 30 is in providing the facility pointed out in the IN-OUT command description, whereby a plurality of different peripherals can be selected and initiated by a plurality of IN-OUT commands in a manner which permits the sharing of seek time between peripherals.

As for data and control lines 30, these are divided into two branches 30a and 30b. X peripherals share branch 30a and Y peripherals share branch 30b, one of the two branches being given priority with respect to the I/O logic. Data transfer to or from the I/O logic and a selected peripheral occurs during the I/O micro-command $N_{13}$ and, as indicated in FIG. 4, register MB is used as a buffer for this purpose. Data to be transferred to a selected peripheral is set up in data register MB from where it is applied via the I/O logic to the respective branch lines 30a or 30b which transmits the data to the selected peripheral. Data to be transferred from a selected peripheral is transmitted to the I/O logic along the respective branch line 30a or 30b after which the I/O logic sets up the data in register MB.

Now considering the cooperation of the I/O logic with respect to control logic K, it will be noted from FIG. 4 that the I/O logic receives control signals $K_{I/O}$ from control logic K while providing I/O signals thereto. It will be understood that during the P counts of IN-OUT micro-command $N_{12}$ and I/O micro-command $N_{13}$, control logic K adjusts its K output signals so as to control the hardware components in a manner which will cause addressing and read out of the appropriate data and register locations in memory 12 corresponding to a selected peripheral, whereby to provide peripheral selection and initiation during IN-OUT micro-command $N_{12}$, and the transfer of data between the appropriate locations in memory 12 and the selected peripheral during I/O micro-command $N_{13}$.

With regard to the provision of micro-command signals $N_{12}$ and $N_{13}$ to which control logic K responds to provide appropriate control of the I/O logic and other hardware components during these micro-commands, it will be remembered from FIG. 3 that the IN-OUT micro-command $N_{12}$ is entered following micro-command $N_{05}$ if Q indicates that an IN-OUT command is being executed. This is implemented in FIG. 4 by register NA being set to $N_{12}$ in response to $K_{NA}$ during timing pulse $t_1$ of the basic cycle corresponding to the last P count of micro-command $N_{05}$; micro-command $N_{12}$ is then initiated during the next cycle as a result of $K_{NB}$ causing register NB to copy $N_{12}$ from NA during timing pulse $t_0$.

With regard to micro-command $N_{13}$, it will be remembered that micro-command $N_{13}$ is inserted following any other micro-command in response to the detection of an interrupt condition in the I/O logic during the last count of a micro-command. This is implemented in FIG. 4 as follows. When an interrupt condition exists in the I/O logic as a result of a selected peripheral requiring access to the memory, the I/O output signals of the I/O logic will be set accordingly and applied to control logic K. Then, when the last P count of the current micro-command is reached, control logic K will produce program decision signals $K_{NB}$ which cause register NB to be set to the I/O micro-command $N_{13}$ during $t_0$ of the next cycle, instead of copying the next micro-command from register NA, which is retained in NA for use in initiating the next micro-command after the I/O micro-command $N_{13}$ is completed.

It will be understood that such operations of the I/O logic, as described herein, not only provide the system with multiple degrees of simultaneity, but also offer the significant advantage of permitting the I/O logic to share the use of various parts of ALU5 (FIG. 1) as well as sharing the use of memory 12.

DETAILED EXAMPLE OF HARDWARE OPERATION DURING AN ARITHMETIC COMMAND

Having described the hardware components of FIG. 4, an example of operation during the performance of a typical command, namely an ARITHMETIC command, will now be presented in detail with reference to FIGS. 7–11 in order to clearly and fully disclose to those skilled in the art how to put the invention into practice and achieve its objects and advantages. It will also be illustrated how an I/O micro-command $N_{13}$ may be inserted during execution of the ARITHMETIC command. It is to be understood, of course, that the description to be presented is merely intended to be exemplary, and should not, therefore, be considered as restricting the scope of the invention.

For the purpose of this exemplary description, it will be assumed that the system is in the user state (i.e., control logic latch $KL_S$ is not set), that the command to be executed is a two-address ARITHMETIC command $QR_AA_2A_1TR_BB_2B_1$ stored in the command section of memory 12 (FIG. 2), and that the command is provided for the purpose of adding a two character first operand A (comprised of characters $a_1$ and $a_2$) at a first location in the operand section of memory 12 to a two character second operand B (comprised of characters $b_1$ and $b_2$) at a second location in the operand section of memory 12, the sum $A+B$ being stored back into the B operand location. It will also be assumed that the A operand requires indexing while the B operand does not.

Accordingly, Q will designate a command code indicating an add operation, $R_A$ will designate the address of an index register whose contents will be added to the partial address designated by $A_2A_1$ to obtain the effective address from which the first or least significant character $a_1$ of the A operand may be derived, T will designate that the A and B operands are each of 2 characters in length, and $R_B$ will designate that no indexing of the B operand is required and that the address designated by $B_2B_1$ is, therefore, the effective address of the B operand from which the first or least significant character $b_1$ of the B operand may be derived. It will be understood from the previously described micro-command flow illustrated in FIG. 3 that the micro-command flow for this exemplary ARITHMETIC command is $N_{01}$ to $N_{02}$ to $N_{03}$ to $N_{05}$ to $N_{09}$. An I/O micro-command $N_{13}$ is inserted after $N_{02}$ to demonstrate how such insertion may be accomplished. FIG. 7 specifies the particular NP basic cycles which occur during this micro-command flow, and FIGS. 8–11 provides summaries of the most pertinent activity occurring during each of the program counts P of each microcommand. Accordingly, it will be found helpful to frequently refer to FIGS. 7–11 along with FIGS. 1–6 as an aid in more easily understanding the detailed description of activities occurring during each program count which will now be presented.

MICRO-COMMAND $N_{01}$

As will be remembered from the previous micro-command description, micro-command $N_{01}$ begins the command set-up phase for all commands and may be entered from micro-commands $N_{00}$, $N_{08}$, $N_{09}$, $N_{10}$, $N_{11}$, $N_{12}$ or $N_{13}$. The following initial conditions will be assumed to be present immediately prior to the beginning of the first cycle or count or micro-command $N_{01}$; (1) control logic latch $KL_S$ will indicate that the system is in the user state, (2) register NA will be set to micro-command $N_{01}$, (3) control logic latch $KL_P$ (FIG. 6) will be set to cause $K_P$ to reset program count P to $P_{00}$ during $t_0$ of the next cycle, (4) control logic latch $KL_{I/O}$ (FIG. 6) will be set to indicate that an interrupt condition is not present in the I/O so as to cause $K_{NB}$ to permit NB to copy NA during $t_0$ of the next cycle, (5) address register LB (FIG. 4) will contain the address of the first character $C_1R$ of control register $CR^*$ in the register section of memory 12, and (6) logic circuit H will be set so as to permit the $C_1R^*$ address in LB to pass therethrough to address memory 12 via memory address lines L. $CR^*$ is a two character register comprised of first and second registers $C_1R^*$ and $C_2R^*$ which at the start of $N_{01}$ respectively contain the low order and high order address of the first character Q of the ARITHMETIC command to be executed.

Cycle $N_{01}P_{00}$

With the above initial conditions being present at the start of micro-command $N_{01}$, it will be understood that during timing pulse $t_0$ (FIG. 5), program counter P is reset to $P_{00}$ in response to $K_P$, and register NB will copy $N_{01}$ from register NA in response to $K_{NA}$, causing microprogram signal $N_{01}$ and program count signal $P_{00}$ at the output of program control 15 (FIG. 4) to become true. Control logic K responds to $N_{01}$ and $P_{00}$ to appropriately adjust its K output signals for the $N_{01}P_{00}$ cycle including: causing memory control signal $K_M$ (which is responsive to latch $KL_M$ in FIG. 6) to indicate to memory 12 that a read-restore memory cycle is to be performed, causing program decision signals $K_{NA}$ to indicate the register NA that it is to retain the $N_{01}$ setting, causing $K_J$ to indicate to adder J that a transfer type of operation is to be performed thereby, and causing $K_{LA-1}$ to provide for the clearing of NA-1 during timing pulse $t_1$ in anticipation of being set up in accordance with the output of adder J during the $t_2$ initiated logic period at the end of the cycle.

Memory 12 operates during $N_{01}P_{00}$, in response to $K_M$ and the LB address, to read out the low order part of the Q address (which will be represented by $ad_1Q$) in character register $CR_1^*$, into register M (FIG. 4), from where it is applied to adder J, M being set to $ad_1Q$ by memory 12 at about 450 nanoseconds of the cycle (FIG. 5). The operation of adder J (FIG. 4) during $N_{01}P_{00}$ is initiated by the occurrence of timing pulse $t_1$ (FIG. 5) and operates, in response to $K_J$, to perform a transfer operation (i.e., adding the output of M with O), whereby $ad_1Q$ is transferred therethrough and appears at the adder output J unchanged. Then, during the logic period initiated by timing pulse $t_2$, address register LA1, in response to $K_{LA}$, is set in accordance with the adder output $ad_1Q$. Also, during the logic period of $N_{01}P_{00}$, $K_{LB}$ causes address register LB to be incremented by 1 so as to be set to the address of the second character register $C_2R^*$ containing the high order address of Q (which will be represented by $ad_2Q$), while $K_H$ causes address logic H to remain set to permit the $C_2R^*$ address set up in LB to be applied therethrough to memory address lines L.

The above operation during $N_{01}P_{00}$ may be abbreviated as follows:

$N_{01}P_{00}$ : $LB$ $ad$ $C_1R^*$ : $R$ : $ad_1Q$ in $C_1R^*$ to $LA-1$ : $KL_P$ : $ad$ $C_1R^*+1=adC_2R^*$ to $LB$ : $H_{LB}$

In the above abbreviation, "$N_{01}P_{00}$" indicates that register NB and program counter P are set during $t_0$ to provide a basic cycle corresponding to count $P_{00}$ of microcommand $N_{01}$; "LB ad $C_1R^*$" indicates that address control logic H is set to permit register LB to address the first character register $C_1R^*$ of control register $CR^*$ in memory 12 (FIG. 2) during $N_{01}P_{00}$; "R" indicates that memory 12 performs a read-restore cycle during $N_{01}P_{00}$; "$ad_1$ Q in $C_1R^*$ to LA–1" indicates that the low order address of Q in register $C_1R^*$ is read out of memory 12 during $N_{01}P_{00}$ and is applied, via register M and adder J, to set register LA–1 to $C_1R$" indicates that latch $KL_P$ (FIG. 6) is reset so that $K_P$ (which is responsive thereto) will permit program counter P to advance to the next count during $t_0$ of the next cycle ("KL$_P$" would indicate that latch KL$_P$ is set so as to cause K$_P$ to reset program counter P to P$_{00}$ during $t_0$ of the next cycle); "$ad$ $C_1R^*+1=adC_2R^*$ to $LB$" indicates that register LB indicates that register LB is incremented by 1 during the logic period to the address of the second character register C$_2$R$^*$ of control register CR$^*$; and "H$_{LB}$" indicates that address logic H is maintained so as to permit the C$_2$R$^*$ address set up in LB to be applied to memory address lines L during the next cycle N$_{01}$P$_{01}$.

Cycle N$_{01}$P$_{01}$

In the next cycle N$_{01}$P$_{01}$, operations are similar to that of the previous cycle N$_{01}$P$_{00}$, except that the P counter counts to P$_{01}$ during $t_0$, in response to which control logic K adjusts K$_{LA-1}$ and K$_{LA-2}$ so as to cause the higher order address of Q (i.e., $ad_2$Q) in C$_2$R$^*$ to be read out therefrom, and via register M and adder J, to be set up in register LA-2 during the logic period, whereby, at the end of N$_{01}$P$_{01}$, registers LA-1 and LA-2 will respectively contain the complete address $ad_1$Q and $ad_2$Q of Q, the first character of the ARITHMETIC command to be executed. Also, during the logic period of N$_{01}$P$_{01}$, address logic H is reset in response to K$_H$ from H$_{LB}$ to H$_{LA}$ in order to permit the Q address in LA-1 and LA-2 to be applied to memory address lines L during the next cycle N$_{01}$P$_{02}$. It will be evident that the above operations occurring during N$_{01}$P$_{01}$ may be abbreviated as follows:

$N_{01}P_{01}:LB$ $adC_2R^*:R:ad_2Q$ in $C_2R^*$ to
$$LA_42:H_{LA}S:LA=ad_1Qad_2Q=adQ$$

It will be noted that the above abbreviation includes an additional notation headed by "S:" to indicate that LA now contains the complete address $adQ$ of Q. Such summaries along with those in FIGS. 7–9 will be provided after certain abbreviations to aid in better understanding what is happening. Also, for greater clarity and ease of understanding, except for address control logic H, abbreviations for a cycle will not include registers not involved therein, such as registers MA and MB during N$_{01}$P$_{00}$ and N$_{01}$P$_{01}$.

Cycle N$_{01}$P$_{02}$

In the next cycle N$_{01}$P$_{02}$, the P counter counts up to P$_{02}$ during $t_0$, and the Q address in register LA (LA-1 and LA-2 taken together) causes memory 12 to read Q out therefrom, which via register M and adder J, is set up in register MB during the logic period in response to K$_{MB}$. Q is also applied, via register M and adder J, to control logic K which, in response to Q, sets latch KL$_Q$ therein (FIG. 6) during the logic period to indicate that a two-address command is being performed, as is the case for the exemplary command being described. Also during the logic period, register LB is set to the address of the QR$^*$ memory register (FIG. 2) which will be used to store Q for the remainder of the command, and address logic H is set to H$_{LB}$ to permit the QR$^*$ memory register address set in LB to address memory 12 during the next cycle N$_{01}$P$_{03}$. The abbreviation for N$_{01}$P$_{02}$ is thus:

$N_{01}P_{02}:LAadQ:R:Q$ to $MB:Q-KL_Q:adQR^*$ to $LB:H_{LB}$

"LA$adQ$" indicates that LA, which is set to the address of Q, will address the memory during N$_{01}$P$_{02}$, and "Q-KL$_Q$" indicates that Q sets latch KL$_Q$ to indicate a two-address command.

Cycle N$_{01}$P$_{03}$

In the next cycle N$_{01}$P$_{03}$, memory 12 performs a clear-write cycle, whereby Q which was placed in MB during N$_{01}$P$_{02}$ is written, via register M, into the QR$^*$ memory register whose address was set into LB during N$_{01}$P$_{02}$. Also, K$_{LA-1}$ and K$_{LA-2}$, in response to N$_{01}$P$_{03}$, cause the Q address in LA-1 and LA-2 to be incremented by 1 to the memory address of the second command character R$_A$, and K$_H$ causes H to be set to H$_{LA}$ to permit the R$_A$ address set up in LB to address memory 12 during the next cycle N$_{01}$P$_{04}$. The abbreviation for N$_{01}$P$_{03}$ is thus:

$N_{01}P_{03}:LBadQR^*:W:Q$ in $MB$ to $QR^*:LA$ to
$$adQ+1=adR_A:H_{LA}$$

where "W" indicates a clear-write memory cycle, and "Q in MB to QR$^*$" indicates that register MB contains Q which, via register M, is written into memory register QR$^*$ during the write portion of the clear-write memory cycle.

Cycle N$_{01}$P$_{04}$

During N$_{01}$P$_{04}$, the second character R$_A$ of the command is read out of memory 12 and, via register M and adder J, is set up in register MB during the logic period. Also, R$_A$ is applied, via register M and adder J, to control logic K, which, in response to R$_A$, sets latch KL$_X$ therein (FIG. 6) to KL$_X$ during the logic period in order to indicate that R$_A$ designates that indexing of the A operand is required in the exemplary command being described. Also during the logic period, register LB is set to the address of memory register R$_A$R$^*$ (FIG. 2) and address logic H is set to H$_{LB}$ to permit the R$_A$R$^*$ address in LB to address memory 12 during the next cycle N$_{01}$P$_{05}$. The abbreviation for N$_{01}$P$_{04}$ is thus:

$N_{01}P_{04}:LAadR_A:R:R_A$ to
$$MB:R_A-KL_X:adR_AR^*\text{ to }LB:H_{LB}$$

"R$_A$-KL$_X$" indicates that latch KL$_X$ is set in response to R$_A$ to indicate that indexing is required.

From the foregoing, the abbreviation system used for describing operations during each cycle should be evident. Accordingly, the remainder of the description of the exemplary ARITHMETIC command will be comprised primarily of these abbreviations, with comments being occasionally provided to facilitate understanding.

Cycle N$_{01}$P$_{05}$ $N_{01}P_{05}:LBadR_AR^*:W:R_A$ in $MB$ to
$$R_AR^*:adR_A+1=adA_2\text{ to }LA:H_{LA}$$

Cycle N$_{01}$P$_{06}$ $N_{01}P_{06}:LAadA_2:R:A_2$ to $MB:adA_2R^*$ to $LB:H_{LB}$.

Cycle N$_{01}$P$_{07}$ $N_{01}P_{07}:LBadA_2R^*:W:A_2$ in $MB$
$$\text{to }A_2R^*:adA_2+1adA_1=\text{ to }LA:H_{LA}$$

Cycle N$_{01}$P$_{08}$ $N_{01}P_{08}:LAadA_1:R:A_1$ to
$$MB:adA_2R^*+1=adA_1R^*\text{ to }LB:H_{LB}$$

Cycle N$_{01}$P$_{09}$ $N_{01}P_{09}:LBA_1R^*:W:A_1$ in $MB$ to
$A_1R^*:KL_X:NA$ to $N_{02}:KL_P:LB$ to $adR_AR^*:H_{LB}$
$S:QR^*:=Q$, $R_AR^*=R_A$, $A_2R^*=A_2$, $A_1R^*=A_1$ Cycle N$_{01}$P$_{09}$ is the last of micro-command N$_{01}$. The notation "NA to N$_{02}$" indicates that program decision signals K$_{NA}$, in response to latch KL$_X$ (which was set to KL$_X$ during N$_{01}$P$_{04}$ to indicate indexing), cause register NA to be set during timing pulse $t_1$ of N$_{01}$P$_{09}$ to the next micro-command N$_{02}$ to perform the indexing required to obtain the effective address of the A operand.

MICRO-COMMAND N$_{02}$

Cycle N$_{02}$P$_{00}$ $N_{02}P_{00}:LBadR_AR^*:R:R_A$ in $R_AR^*$
$$\text{to }LA=adI_1R_1^*:KL_P':KL_X:adA_1R^*\text{ to }LB:H_{LB}$$

"KL$_X$" indicates that latch KL$_X$ remains set in response to R$_A$ to provide incremental indexing, "R$_A$ in R$_A$R$^*$ to $LA=adI_1R_1^*$" indicates that LA is set in accordance with R$_A$ to the low order address of a selected memory index register IR$^*$ whose contents will be added to A$_2$A$_1$ to obtain the effective address of the A operand. For this example, it will be assumed that the selected index register is $IR_1^*$ comprising $I_1R_1^*$ and $I_2R_1^*$ (FIG. 2).

Cycle $N_{02}P_{01}$ $N_{02}P_{01}:LBadA_1R^*:R:A_1$ in $A_1R^*$ to $MA:H_{LA}$

Cycle $N_{02}P_{02}$ $N_{02}P_{05}:LBadA_2R^*:R:A_2$
  in $I_1R_1^*+A_1$ in $MA$ to $MB:KL_C:H_{LB}$ "$I_1R_1$ in $I_1R_1^*+A_1$ in $MA$ to $MB$" indicates that the character $I_1R_1$ in register $I_1R_1^*$ of the memory index register $IR_1^*$ selected by $R_A$ is added by adder J to $A_1$ in register MA, and the sum set in MB during the logic period. "$KL_C$" indicates that latch $KL_C$ is set during the logic period because a carry resulted from the addition operation.

Cycle $N_{02}P_{03}$ $N_{02}P_{03}:LBadA_1R^*:W:A_1+I_1R_1$ in $MB$ to $A_1R^*:H_{LA}$ Address register LB is set to the address of register $I_1R_1^*$ of the memory index register $IR_1^*$ selected by $R_A$ in order to provide for incremental indexing during the next cycle.

Cycle $N_{02}P_{04}$ $N_{02}P_{04}:LAadI_1R_1^*:W:I_1R_1+A_1$ in $MB$
  to $I_1R_1^*:adA_1R^*+1=adA_2R^*$ to $LB:H_{LB}$ "$I_1R_1+A_1$ in $MB$ to $I_1R_1^*$" indicates that the sum of $A_1+I_1R_1$ is written into $I_1R_1^*$ during $N_{02}P_{04}$, as required for incremental indexing.

Cycle $N_{02}P_{05}$ $N_{02}P_{05}:LBadA_2R^*:R:A_2$
  to $MA:KL_{I/O}:adI_1R_1^*+1=adI_2R_2^*:H_{LA}$ "$KL_{I/O}$" indicates latch $KL_{I/O}$ (FIG. 6) has been set by I/O input signals from the I/O logic (FIG. 4) to indicate that an interrupt I/O condition is present in the I/O logic.

Cycle $N_{02}P_{06}$ $N_{02}P_{06}:LAadI_2R_1^*:R:I_2R_1+A_2$
  in $MA+KL_C$ to $MB:adA_1R^*+1=adA_2R^*:H_{LB}$ "$A_2$ in $MA+KL_C$ to MB" indicates that the carry from the addition during $N_{02}P_{02}$ is taken into account.

Cycle $N_{02}P_{07}$ $N_{02}P_{07}:LBadA_2R^*:W:I_2R_2+A_2+KL_C$
  in $MB$ to $A_2R^*:adI_1R_1^*+1=adI_2R_1^*$ to $LA:H_{LA}$ Cycle $N_{02}P_{08}$ $N_{02}P_{08}:LAadI_2R_1^*:W:I_2R_1+A_2+KL_C:KL_P:NA$
  to $N_{03}:KL_{I/O}-adC_1W_1^*$
  to$LB:H_{LB}S:AR^*$ and $IR_1^*=I_1R_1I_2R_1+A_1A_2=$eff ad $A$ operand "$KL_{I/O}-adC_1W_1^*$ to LB" indicates that latch $KL_{I/O}$ which was set during $N_{02}P_{05}$ to indicate an interrupt I/O condition causes $K_{LB}$, in response thereto and to I/O signals applied to control logic K, to set LB to the address of the first character $C_1W_1$ in control word register $CW_1^*$ which in this example will be assumed to correspond to the peripheral requesting access. Registers $C_1W_1^*$ and $C_2W_1^*$ of $CW_1^*$ contain the memory address into which a data character D from the selected peripheral is to be written, or from which a data character D is to be read out and transmitted to the selected peripheral during the inserted I/O micro-command $N_{13}$.

I/O MICRO-COMMAND $N_{13}$

Cycle $N_{13}P_{00}$ $N_{13}P_{00}:LBadC_1W_1^*:R:C_1W_1+1$ to $MB:KL_{I/O}:KL_C:KL_{P'}:H_{LB}$ "$N_{13}P_{00}$" indicates the $N_{BN}$, in response to $KL_{I/O}$, causes NB to be set to the I/O micro-command $N_{13}$ during $t_0$ instead of copying $N_{03}$ from NA, which retains its $N_{03}$ setting for use in returning to the ARITHMETIC command micro-command flow a the completion of $N_{13}$. "$C_1W_1+1$ to MB" indicates that $C_1W_1$ is incremented by 1 in order to update the memory address in $CW_1^*$ for use during the next I/O micro-command $N_{13}$. "$KL_C$" indicates a carry.

Cycle $N_{13}P_{01}$ $N_{13}P_{01}:LBadC_1W_1^*:W:C_1W_1+1$ in $MB$ to $C_1W_1^*$:
  $C_1W+1$ in $MB-1$ to $LA-1=C_1W_1$ in $LA-1$:$adC_1W_1^*$
  $+1=adC_2W_1^*$ to $LB:H_{LB}$
  $S:C_1W_1^*=C_1W_1+1$, $LA-1=C_1W_1$ "$C_1W_1+1$ in $MB=1$ to $LA-1$" indicates that $C_1W_1$ is incremented by 1 by adder J and the result $C_1W_1$ is set in the LA-1 portion of address register LA (FIG. 4).

Cycle $N_{13}P_{02}$ $N_{13}P_{02}:LBadC_2W_1^*:R:C_2W_1+KL_C$ to $MB:H_{LB}$

Cycle $N_{13}P_{03}$ $N_{13}P_{03}:LB$ $adC_2W_1^*:W:C_2W_1+KL_{C1}$ in $MB$ to $C_2W_1^*$:
  $C_2W_1+1$ in $MB-1$ to $LA-2=C_2W_1$ in $LA-2$: $KL_X$:$ad$
  $C_2W_1^*+1=adC_2W_1^*+1=C_3W_1^*$ to $LB:H_{LB}$
  $S:C_2W_1^*=C_2W_1+KL_{C1}$, $LA=2=C_2W_1$ "$KL_X$" in this micro-command indicates that latch $KL_X$ is set in response to I/O signals from the I/O logic to indicate that the direction of data transfer is from the selected peripheral to memory 12.

Cycle $N_{13}P_{04}$ $N_{13}P_{04}:LBadC_3W_1^*:R:C_3W_1$ to $MA:KL_X-D$ to $MB:H_{LA}$
  $S:LA=C_1W_1C_2W_1=adD$ "$C_3W_1$ to MA" indicates that a third character $C_3W_1$ from $CW_1^*$ is read into MA. $C_3W_1$ designates the terminating memory address for data transfer between the selected peripheral and memory. "$KL_X-D$ to MB" indicates that $K_{MB}$ in response to $KL_X$ causes a data character D transmitted to the I/O logic from the selected peripheral to be set up in MB for writing into the appropriate memory address $ad$ D determined by $C_1W_1C_2W_2$ in LA during the next cycle $N_{13}P_{05}$.

Cycle $N_{13}P_{05}$ $N_{13}P_{05}:LAadD:KL_X-W:D$ in $MB$ to $adD:C_3W_1$ in $MA$
  $C_1W_1C_2W_1:KL_P:LBadC_1R^*:H_{LB}$ This is the last cycle of I/O micro-command $N_{13}$. "$KL_X-W$" indicates that, in response to $KL_X$ (which was set in cycle $N_{13}P_{03}$ to indicate a transfer from the selected peripheral), memory 12 operates to perform a clear-write cycle during which D is written into $ad$ D in memory. "$C_3W_1$ in MA $C_1W_1C_2W_1$" indicates that $C_1W_1C_2W_1$ in LA and $C_3W_1$ in MA are compared by control logic K and found not equal, indicating that, as will be assumed in the example being described herein, D is not the last character required to be sent in the data transfer operation between the selected peripheral and memory 12, the transfer operation having been initiated at some earlier time by an IN-OUT command. "LB $ad$ $C_1R^*$" indicates that LB is set during $t_1$ of $N_{13}P_{05}$ to the address of $C_1R^*$ required for the next cycle $N_{03}P_{00}$ in response to NA, which will have retained its $N_{03}$ setting throughout $N_{13}$; also during $t_0$ of the next cycle $N_{03}P_{00}$. Mb will copy $N_{03}$ from NA to permit the ARITHMETIC command to proceed to $N_{03}$ and thus continue from the point of interruption.

Although not assumed in the illustrative example being presented herein, if a comparison of $C_3W_1$ in MA and $C_1W_1C_2W_2$ in LA were to produce equality, indicating that D is the last character of the particular data transfer operation being performed, then the I/O logic would be caused to send a terminating signal to terminate operations of the selected peripheral until selected by another IN-OUT command. In response to this terminating signal, the peripheral sends a status signal to the I/O logic which is stored in its respective control word register CW in memory 12 (FIG. 2). This status signal may, for example, indicate a successful transfer operation with respect to the peripheral, or an error or some other condition.

The terminating signal may also be used to set supervisor latch $KL_S$ to switch the system to the supervisor state to permit insertion of one or more additional microcommands (constituting an internal command) for the purpose of checking the accuracy of the completed data transfer operations, after which the flow would be caused to proceed to $N_{03}P_{00}$ so as to permit the ARITHMETIC command to proceed from the point of interruption.

MICRO-COMMAND $N_{03}$

Cycle $N_{03}P_{00}$ $N_{03}P_{00}:LBadC_1R^*:R:C_1R+4$ to $LA-1:KL_P:adC_1R^*+1$
$=adC_2R^*$ to $LB:H_{LB}$ Cycle $N_{03}P_{01}$ $N_{03}P_{01}:LBadC_2R^*:R:C_2R$ to $LA-1:H_{LA}S:LA=adT$ Cycle $N_{03}P_{02}$ $N_{03}P_{02}:LAadT:T$ to $MB:adTR^*$ to $LB:H_{LB}$ Cycle $N_{03}P_{03}$ $N_{03}P_{03}:LBadTR^*:W:T$ in $MB$ to
$TR^*:adT+1=adR_B$ to $LA:H_{LA}$ Cycle $N_{03}P_{04}$ $N_{03}P_{04}:LAadR_B:R:R_B$ to $MB:adR_BR^*$ to $LB:H_{LB}$ Cycle $N_{03}P_{05}$ $N_{03}P_{05}:LBadR_BR^*:W:R_B$ in $MB$ to
$R_BR^*:adR_B+1=adB_2$ to $LA:H_{LA}$ Cycle $N_{03}P_{06}$ $N_{03}P_{06}:LAadB_2:R:B_2$ to $MB:adB_2R^*$ to $LB:H_{LB}$ Cycle $N_{03}P_{07}$ $N_{03}P_{07}:LBadB_2R^*:W:B_2$ in $MB$ to
$B_2R^*:adB_2+1=adB_1$ to $LA:H_{LA}$ Cycle $N_{03}P_{08}$ $N_{03}P_{08}:LAadB_1:R:B_1$ to $MB:adB_1R^*$ to $LB:H_{LB}$ Cycle $N_{03}P_{09}$ $N_{03}P_{09}:LBadB_1R^*:W:B_1$ in $MB$ to
$B_1R^*:NA$ to $N_{05}:KL_P:adTR^*$ to $LB:H_{LB}$
$S:AR^*=adA$ operand, $BR^*=adB$ operand,
$TR^*=T$, $QR^*=Q$ Since, in the assumed example, indexing is not required for the B operand, $R_B$ will not cause latch $KL_X$ to be set for indexing (as did $R_A$ during $N_{01}P_{04}$), and NA will accordingly be set to go to $N_{05}$.

MICRO-COMMAND $N_{05}$

Cycle $N_{05}P_{00}$ $N_{05}P_{00}:LBadTR^*:R:T$ to $MB:KL_P':adT_CR^*$ to $LB:H_{LB}$ Cycle $N_{05}P_{01}$ $N_{05}P_{01}:LBadT_CR^*:W:T$ in $MB$ to
$T_CR^*:adQR^*$ to $LB:H_{LB}$
$S:T_CR=T$ As indicated by the summary, T which was written into memory register $TR^*$ during $N_{03}P_{03}$ is read out therefrom during $N_{05}P_{00}$ and written into tally counting register $T_CR^*$ in memory 12 during $N_{05}P_{01}$ so as to prepare for tally counting. As pointed out previously in connection with the general description of micro-command $N_{05}$, a separate memory register $T_CR^*$ is provided for tally counting in order that T may be retained in memory register $TR^*$ for use as the T value of the next command if it is of the one-address type.

Cycle $N_{05}P_{02}$ $N_{05}P_{02}:LBadQR^*:R:Q$ to $MA:adFR^*$ to $LB:H_{LB}$

Cycle $N_{05}P_{03}$ $N_{05}P_{03}:LBadFR^*:R:F$, Q in $MA-MB$,
$KL_F:Q_{cc}$ in $MA$ to $KL_{N1-3}:adFR^*$ to $LB$ "F, Q in MA–MB, $KL_F$" indicates that F read out of $FR^*$ and Q set in MA are logically combined by control logic K so as to appropriately set or reset one or more flag latches, such as $KL_F$ in FIG. 6, for example, and to cause $K_{MB}$ to set updated flags in register MB. "$Q_{cc}$ in MA to $KL_{N1-3}$" indicates the $Q_{cc}$, the command code portion of Q which was set in MA during $N_{05}P_{02}$, is set in command code latches $KL_{N1}$ to $KL_{N3}$ (FIG. 6) to store the command code $Q_{cc}$ for later use. If the command code $Q_{cc}$ is illegal for some reason (for example, because $Q_{cc}$ is a number which is not one of the command codes), the K input logic would, among other things, cause supervisor latch $KL_S$ to be set during $N_{05}P_{03}$ to transfer the system to the supervisor state, and also cause the system to initiate appropriate corrective action.

Cycle $N_{05}P_{04}$ $N_{05}P_{04}:LBadFR^*:W:\underline{F}$ in $MB$ to $FR^*:adC_1R^*$ to $LB:H_{LB}$
$S:FR^*=\underline{F}$, $KL_N=Q_{cc}$, $T_CR^*=T$ "$\underline{F}$" indicates that the updated flags are written back into memory flag register $FR^*$.

Cycle $N_{05}P_{05}$ $N_{05}P_{05}:LBC_1R^*:R:C_1R$ to $MB:H_{LB}$

"$C_1R$ to MB" indicates that $\overline{C_1R}$, which is the address of the first character Q of the current command is updated by added J to $C_1R$, which is the address of the first character Q of the next command; $C_1R$ is then set in MB during the logic period of $N_{05}P_{05}$.

Cycle $N_{05}P_{06}$ $N_{05}P_{06}:LBadC_1R^*:W:\underline{C_1R}$ in $MB$ to
$C_1R^*:adC_1R^*+1=adC_2R^*$ to $LB:H_{LB}$ Cycle $N_{05}P_{07}$ $N_{05}P_{07}:LBadC_2R^*:R:\underline{C_2R}$ to $MB:H_{LB}$ Cycle $N_{05}P_{08}$ $N_{05}P_{08}:LBadC_2R^*:W:\underline{C_2R}$ in $MB$ to
$\overline{C_2R^*}:NA$ to$N_{09}:KL_P:adT_CR^*$ to $LB$
$S:AR^*=eff\ adA$ operand, $BR^*=eff\ adB$ operand,
$T_CR^*=T$, $KL_{N1-3}=Q_{cc}$, $CR^*=adQ$ of next command

MICRO-COMMAND $N_{09}$

Cycle $N_{09}P_{00}$ $N_{09}P_{00}:LBadT_CR^*:R:T-1$ to $MA,MB:KL_P':H_{LB}$

"T–1 to MA, MB" indicates that the talley number T which is 2 in the assumed example) in tally count register $T_CH^*$ is read out, decremented by 1, and set up in registers MA and MB during the logic period of $N_{09}P_{00}$.

Cycle $N_{09}P_{01}$ $N_{09}P_{01}:LBadT_CR^*:W:T-1$ in
$MB$ to $T_CR^*:adT_1R^*$ to $LB:H_{LB}$ Cycle $N_{09}P_{02}$ $N_{09}P_{02}:LBadA_1R^*:R:A_1R+T_C-1$ in
$MA$ to $LA-1=ad_1a_1:adA_2R^*$ to $LB:H_{LB}$ "$A_1R+T-1$ in MA to $LA-1=ad_1a_1$" indicates that adder J adds the low order A operand address $A_1R$ to the decremented tally $T_C-1$ in register MA, the sum $ad_1a_1$ being the low order address of the first character $a_1$ of the A operand, and this sum is set in registers MA and LA-1 during the logic period of $N_{09}P_{02}$.

Cycle $N_{09}P_{03}$ $N_{09}P_{03}$:$LBadA_2R^*$:$R$:$A_2R$ to $LA-2=ad_2a_1H_{LA}$
$S$:$LA=adb_1$ Cycle $N_{09}P_{04}$ $N_{09}P_{04}$:$LAada_1$:$R$:$a_1$ to $MA$:$adB_1R^*$ to $LB$:$H_{LB}$ Cycle $N_{09}P_{05}$ $N_{09}P_{05}$:$LBadB_1R^*$:$R$:$B_1R+T-1$ in
$MA$ to $LA-1=ad_1b_1$:$adB_2R^*$ to $LB$:$H_{LB}$ Cycle $N_{09}P_{05}$ $N_{09}P_{06}$:$LBadB_2R^*$:$R$:$B_2R$ to $LA-2=ad_2b_1$:$H_{LA}$ $S$:$_{LA}=adb_1$ Cycle $N_{09}P_{07}$ $N_{09}P_{07}$:$LAadb_1$:$R$:$b_1+a_1$ in $MA=c_1$ to
$MB$:$KL_C$:$H_{LA}$"$b_1+a_1$ in $MA=c_1$ to $MB$"

indicates that the first (i.e., the least significant) character $b_1$ of the B operand, applied to adder J from memory register M, and the first (i.e., the least significant) character $a_1$, applied to adder J from register MA, are added by adder J and the sum $c_1$ placed in register MB. $KL_C$ indicates that carry latch $KL_C$ is set, since it will be assumed that the addition of $a_1$ and $b_1$ produced a carry.

Cycle $N_{09}P_{08}$ $N_{09}P_{08}$:$LAadb_1$:$W$:$c_1$ in $MB$ to $adb_1$ in
memory:$KL_P$:$adT_CR^*$ to $LB$:$H_{LB}$ $S$:$c_1=a_1+b_1$ written in $adb_1$ in memory "$KL_P$" indicates that the P counter is to be reset to $P_{00}$ during timing pulse $t_0$ of the next cycle. Register NA remains unchanged. Accordingly, cycles $N_{09}P_{00}$ to $N_{09}P_{08}$ will be repeated so as to permit the second characters $a_2$ and $b_2$ of the A and B operands to be added in the same way as the first characters $a_1$ and $b_1$. It will thus be understood that the flow $N_{09}P_{00}$ to $N_{09}P_{08}$ will repeat until all of the respective characters of the A and B operands have been added, the number of characters in the A and B operands being indicated by the initial T value stored in $T_CR^*$ during $N_{09}P_{01}$. Since, in the assumed example $T=2$, the A and B operands each comprises two characters, and only one repeat of the $N_{09}P_{00}$ to $N_{09}P_{08}$ flow will therefore occur as set out below, the NP designations being provided with a "2" superscript to indicate that the second $N_{09}P_{00}$ to $N_{09}P_{08}$ flow is occurring in order to add the second characters $a_2$ and $b_2$ of the A and B operands.

Cycle $N_{09}P_{00}{}^2$ $N_{09}P_{00}{}^2$:$LBadT_CR^*$:$R$:$T-2=0$ to
$MA$, $MB$:$T-2=0-KL_X$:$KL_P$:$H_{LB}$ $T-1=0-KL_X$" indicates that latch $LK_X$ is set as a result of the tally from $T_CR^*$ being decremented to 0.

Cycle $N_{09}P_{01}{}^2$ $N_{09}P_{01}{}^2$:$LBadT_CR^*$:$W$:$T-2$ in
$MB$ to $T_CR^*$:$adA_1R^*$ to $LB$:$H_{LB}$ Cycle $N_{09}P_{02}{}^2$ $N_{09}P_{02}{}^2$:$LBadA_1R^*$:$R$:$A_1R+T-2$ in
$MA$ to $LA-1=ad_1a_2$:$A_2R^*$ to $LB$:$H_{LB}$ Cycle $N_{09}P_{03}{}^2$ $N_{09}P_{03}{}^2$:$LBadA_2R^*$:$R$:$A_2R$ to
$LA-2=ad_2a_2$:$H_{LA}S$:$LA=ada_2$ Cycle $N_{09}P_{04}{}^2$ $N_{09}P_{04}{}^2$:$LAada_2$:$R$:$a_2$ to $MA$:$adB_1R^*$ to $LB$:$H_{LB}$ Cycle $N_{09}P_{05}{}^2$ $N_{09}P_{05}{}^2$:$LBadB_1R^*$:$R$:$B_1R+T-2$ in
$MA$ to $LA-1=ad_1b_2$:$B_2R^*$ to $LB$:$H_{LB}$ Cycle $N_{09}P_{06}{}^2$ $N_{09}P_{06}{}^2$:$LBadB_2R^*$:$R$:$B_2R$ to
$LA-2=ad_2b_2$:$H_{LA}S$:$LA=adb_2$ Cycle $N_{09}P_{07}{}^2$ $N_{09}P_{07}{}^2$:$LAadb_2$:$R$:$b_2+a_2$ in $MA+\underline{KL_C}=c_2$ to $MB$:$H_{LA}$ Cycle $N_{09}P_{08}{}^2$ $N_{09}P_{08}{}^2$:$LAadb_2$:$W$:$c_2$ in $MB$ to $adb_2$ in
memory:$\underline{KL_P}$:$NA$ to $N_{01}$:$LB$ to $adC_1R^*$:$H_{LB}$ The ARITHMETIC command is now over and the flow proceeds to micro-command $N_{01}$ to begin operations for the next command.

EXAMPLES OF LOGICAL CIRCUITRY USED IN FORMING HARDWARE COMPONENTS

As mentioned previously, the hardware components illustrated in FIG. 4 are preferably formed of combinations of a single basic NAND circuit of the type disclosed in the aforementioned copending patent application, Ser. No. 505,477, filed Oct. 28, 1965. While there are various known ways in the art of combining NAND circuits to provide the hardware component functions described herein, the NAND circuit combinational approaches exemplified in FIG. 12 for data register MA and FIG. 13 for address register LB are preferred and will now be described.

Referring first to FIG. 12, it will be assumed for the purposes of this description that data register MA provides eight binary output signals MA-1 to MA-8 from eight respective latches 51 to 58 which are settable in response to eight binary input signals $J_1$ to $J_8$ from adder J under the control of signal $K_{MA}$ from control logic K, and timing signals $t_1$ and $t_2$. As will be evident from FIG. 12, each of latches 51 to 58 is formed of two cross-coupled NAND circuits, each NAND circuit being indicated by a triangle having an "n." Each such latch operates so as to be reset (that is, its respective MA output becomes false) in response to a reset signal, and to be set (that is, its respective MA output becomes true) in response to a set signal.

If the operation of the MA register called for in a basic cycle is to receive new information from adder J, control signal $K_{MA}$ will be such as to enable NAND circuits 71 and 73. As a result, when timing pulse $t_1$ occurs during the cycle, it will pass via NAND circuit 71 to produce a reset signal on line 72 which is applied to the reset inputs of latches 51 to 58, causing resetting thereof. Then, during the logic period of the same basic cycle, timing pulse $t_2$, acting via NAND circuits 73 and 75, will produce a true signal on line 76, enabling NAND circuit 61 to 68 to respond to respective outputs $J_1$ to $J_8$ from adder J, whereby respective latches 51 to 58 will be set in accordance with $J_1$ to $J_8$. If the MA register is not to receive new information during a basic cycle, $K_{MA}$ will be such as to inhibit NAND circuits 71 and 73 during the cycle, whereby latches 51 to 58 and thus the MA register outputs MA-1 to MA-8 will remain unchanged.

Besides register MA, FIG. 12 additionally illustrates the portion of control logic K (FIGS. 4 and 6) involved in producing control signal $K_{MA}$ in response to appropriate N and P signals and control logic latches $KL_{N1}$ to $KL_{N3}$. As is conventional, if an N, P or $KL_N$ signal is "primed," it indicates that the "inverse" of the signal is being applied, rather than the signal itself. A comparison of this $K_{MA}$ portion of control logic K with the previously presented example of the execution of an ARITHMETIC command in connection with FIGS. 7–11 will readily reveal how signal $K_{MA}$ is produced to provide the control of register MA required during each cycle. For example, reference to cycle $N_{05}P_{02}$ will reveal that during this cycle register MA is to be set in accordance with Q appearing at the output of adder J. Accordingly, it will be evident from well known NAND logic principles that the logic provided by NAND circuits 91 and 92 in response to $N_{05'}$ and $P_{02}$ is such as to cause latches 51 to 58 to be set in accordance with adder J outputs $J_1$ to $J_8$.

Referring now to the preferred embodiment of address register LB illustrated in FIG. 13, it will be assumed for the purposes of this description that address register LB provides nine binary output signals LB–1 to LB–9 from nine respective latches 101 to 109 which are settable in response to signals from the NA register, control signals $K_{LB}$, and timing signal $t_2$. As mentioned earlier herein, it is not convenient, in view of the functioning required of register LB to permit resetting thereof during timing pulse $t_1$ and setting during timing pulse $t_2$, such as is provided for register MA. Acordingly, timing pulse $t_1$ is not applied to register LB; instead, each latch of register LB is caused to be operated only during timing pulse $t_2$, at which time, either a set or reset signal will be applied to its respective set and reset inputs.

As will be understood from FIG. 13, the set and reset inputs of each of latches 101 to 109 are capable of receiving inputs from one of the following three sources during timing pulse $t_2$: (1) from the NA register (FIG. 4) via NA decoder 125 and respective NAND gates 111*a*, *b* to 119*a*, *b*, which are enabled by $t_2$ acting through NAND gates 127 and 129 only during the last cycle of a micro-command (as indicated by $KL_P$), and only when there is no I/O interrupt condition present (as indicated by $KL'_{I/O}$), whereby to permit register NA to set register LB for the proper starting address for the next microcommand during $t_2$ of the last cycle of all micro-commands except an I/O micro-command; or (2) from working register address logic 135, which is enabled by $t_2$ acting through NAND gates 137 and 139 during each cycle which is not the last cycle of a micro-command (as indicated by $KL_P'$), whereby to permit the working address logic 135 to set the address in register LB during $t_2$ of all cycles except the last cycle of a micro-command; or (3) from I/O address logic 145, which is enabled by $t_2$ acting through NAND gates 147 and 149 only during the last cycle of a micro-command (as indicated by $KL_P$) and only when an I/O interrupt condition is present (as indicated by $KL_{I/O}$), whereby to permit the I/O address logic to set the proper I/O address in register LB during $t_2$ of the last cycle of a micro-command which is to be followed by the I/O micro-command.

FIG. 13 also indicates how register LB can conveniently be controlled to be incremented by the supervisor-user address difference when the system is switched to the supervisor state, such as may occur, for example, by supervisor latch $KL_S$ being turned on by error logic 155 in response to the detection of an error during system operation, or in response to an I/O terminating signal TI produced by the I/O logic at the completion of a transfer operation with a peripheral, as explained in connection with cycle $N_{13}P_{05}$. As shown in FIG. 13, the output of the supervisor latch $KL_S$ is applied to working address logic 135 and NA decoder 125, and cooperates therewith so as to cause addresses produced thereby to be incremented by the supervisor-user address difference, whereby the supervisor control registers (FIG. 2) will automatically be accessed instead of the user working registers.

CONCLUSION

It will be apparent to those skilled in the art that many modifications, additions and variations may be made, both in the structure and operation of the exemplary embodiment presented herein, without departing from the spirit of the invention. Therefore, the present invention is not to be considered as limited to the disclosure presented herein, but is to be considered as including all possible modifications, additions and variations thereof coming within the scope of the invention as defined in the appended claims.

What is claimed is:

1. In a data processing system, means for establishing sequentially occurring basic cycles for said system, a high speed random access memory containing operand and command storage sections and a working register storage section, logical circuit means including memory mode control means cooperating with said memory to provide either a read or a write operation thereof during each basic cycle, said logical circuit means also including memory address means operative to permit only a selected location in a selected one of the memory sections to be addressed during each cycle, whereby access to said sections is on a serial basis, said logical circuit means being operative during each cycle for which said memory performs a read operation to perform logical operations on the data read out of the location in memory selected by said memory address means and operative during each cycle for which said memory performs a write operation to send data to said memory for writing in the location in memory selected by said memory address means, and program control means cooperating with said logical circuit means for determining the type of memory operation to be performed during each cycle, the memory section and location therein to be accessed during each cycle, and the nature of the logical operations to be performed by said logical circuit means during each cycle.

2. The invention in accordance with claim 1, wherein said memory address means includes a first address register for addressing selected locations in the operand and command sections of said memory and a second address register for addressing selected locations in the working register storage section of said memory, and address register control means operable each cycle to permit either the first or second address register to select the location in memory which is to be accessed during the cycle.

3. The invention in accordance with claim 1, wherein said means for establishing sequentially occurring basic cycles for said system includes a single delay line having taps at predetermined locations therealong, means repetitively applying a signal to one end of said delay line, and means coupling respective ones of said taps to said memory and said logical circuit means and said program control means for controlling the timing of the operations performed thereby during each cycle.

4. The invention in accordance with claim 1, wherein said working register storage section includes a set of user registers and a corresponding set of supervisor registers, wherein said logical circuit means also includes indicating means to indicate whether the system is in the supervisor or user state, and wherein said memory address means is responsive to said indicating means to address either a user register or a supervisor register.

5. The invention in accordance with claim 1, wherein said logical circuit means and said program control means are comprised exclusively of combinations of NAND circuits.

6. The invention in accordance with claim 1, wherein said memory provides storage for input-output registers which are addressable by said memory address means on a serial basis with respect to other sections of said memory, wherein said system includes a plurality of peripherals each having a corresponding input-output register, and wherein said logical circuit means includes means responsive to signals from a peripheral for causing said memory address means to address the input-output register corresponding thereto.

7. The invention in accordance with claim 6, wherein said logical circuit means includes a register for receiving data from said memory and for applying data thereto, said register also serving to receive data from said memory for transfer to a selected peripheral and to receive data from a selected peripheral for transfer to said memory.

8. The invention in accordance with claim 1, wherein said program control means includes means for generating first and second pluralities of program control signals, each of said first plurality of program control signals representing a micro-command and said second plurality of program control signals designating steps occurring in the performance of a micro-command, and wherein said logical circuit means is responsive to said program control signals for determining the operations which are to occur during each basic cycle.

9. The invention in accordance with claim 8, wherein said program control means includes means for activating one of said first plurality and one of said second plurality present cycle.

10. The invention in accordance with claim 9, wherein said means for activating operates each cycle to select the program control signals to be activated during the next cycle in response to the program control signals activated during the present cycle and the results of logical operations performed by said logical circuit means during the 11. The invention in accordance with claim 9, wherein said means for activating includes a counter for generating said second plurality of program control signals, said counter being restricted in its operation to either sequential counting in synchronism with each basic cycle or to be reset to an initial count.
in said system includes at least one peripheral cooperating wherein said logical circuit means includes logical cir- of program control signals during each basic cycle, and cuitry responsive to particular combinations of said program control signals.

12. The invention in accordance with claim 11, wherewith the system to permit transfer of data therebetween, and wherein said means for activating is additionally responsive to a request signal from said peripheral.

13. The invention in accordance with claim 11, wherein said logical circuit means includes means for resetting said counter to an initial count at the beginning of each micro-command.

14. In a data processing system capable of operating in either a supervisor or a user state, a high speed random access memory containing storage for working registers including a set of user registers and a corresponding set of supervisor registers, logical circuit means including address means cooperating with said memory to provide reading or writing from a selected location therein, said logical circuit means also including indicating means to indicate whether the system is in the supervisor or user state, and program control means for controlling said logical circuit means, said logical circuit means further including means responsive to said indicating means for causing said address means to address either said user or supervsor registers in said memory in accordance with the indication provided by said indicating means.

15. The invention in accordance with claim 14, wherein each supervisor register has a constant address difference relationship with respect to its corresponding user register, and wherein said memory address means is switched in response to said indicating means to address the set of supervisor registers in said memory instead of the set of user registers by modifying the addresses applied thereto in accordance with said constant address difference relationship.

16. The invention in accordance with claim 15, wherein said logical circuit means includes means for setting said indicating means in response to the detection of an error.

17. The invention in accordance with claim 15, wherein said system includes at least one peripheral cooperating with said logical circuit means so as to permit the transfer of data between said memory and said peripheral, and wherein said logical circuit means includes means for setting said indicating means at the termination of a transfer operation between said epripheral and said memory.

18. The invention in accordance with claim 15, wherein said system includes means for establishing sequentially occurring basic cycles for said system, wherein said memory contains operand and data sections as well as a working register section, wherein said logical circuit means includes memory mode control means cooperating with said memory to provide either a read or a write operation thereof during a basic cycle, and wherein said memory address means is operative to permit only a selected location in a selected one of the memory sections to be addressed during each cycle, whereby access to said sections is on a serial basis.

19. The invention in accordance with claim 18, wherein said means for establishing sequentially occurring basic cycles for said system includes a single delay line along which a signal is propagated and having taps therealong coupled to said memory and said logical circuit means and said program control means for controlling the timing of operations performed thereby during each cycle.

20. In a data processing system, timing means for establishing sequentially occurring basic cycles for said system, a high speed random access memory responsive to said timing means for providing a read or write operation during each basic cycle with respect to a selected location therein, logical circuit means responsive to said timing means for performing logical operations on data read out of said memory and for providing data to said memory for storage therein, and program control means responsive to said timing means and cooperating with said logical circuit means for determining the operations to be performed during each basic cycle, said timing means including a single delay line having taps provided at predetermined locations therealong, said taps being respectively applied to said memory and said logical circuit means and said program control means for controlling the timing of the operations performed thereby, and means for establishing each basic cycle of said system by applying a signal to said delay line for propagation therealong, the positioning of the taps on said delay line being chosen so that the timing of the operations performed by said memory and said logical circuit means and program control means will be such as to perform the operations called for by said program control means.

21. The invention in accordance with claim 20, wherein the taps along said delay line are located so that said program control means provides its output control signals at the beginning of each cycle, said memory provides its output data in the middle of each cycle, and said logical circuit means provides the results of its logical operations at the end of each cycle.

22. The invention in accordance with claim 21, wherein said sequentially occurring basic cycles are each of constant time duration and at a constant repetition rate so as to provide synchronous operation of said system.

23. In a data processing system having a family of commands performable in sequential order, a high speed random access memory providing reading or writing with respect to a selected location therein, means for establishing a plurality of micro-command operations, each command corresponding to a predetermined group of said micro-command operations, logical circuit means cooperating with said memory for executing each command by serially performing its respective predetermined group of micro-command operations, and means for establishing a plurality of program count operations, said logical circuit means including means for performing each micro-command operation by serially performing a variable number of said program count operations.

24. The invention in accordance with claim 23, wherein said means for establishing a plurality of program count operations restricts the system to serially perform said program count operations in a predetermined sequential order with the additional capability of being resettable to an initial count at the end of any program count, whereby to provide a variable number of program count operations for performing a micro-command.

25. The invention in accordance with claim 23, wherein said system is capable of operating in either a supervisor or a user state, wherein said memory includes a set of user working registers and a corresponding set of supervisor working registers, each supervisor register having a constant address difference relationship with respect to its corresponding user register, and wherein said logical circuit means includes indicating means for indicating whether the system is in the user or supervisor state, and wherein said logical circuit means also includes address means cooperating with said memory to provide reading or writing from a selected location therein, said address means being responsive to said indicating means to modify its address to access a supervisor register instead of a user register when said indicating means indicates the system is in a supervisor state.

26. The invention in accordance with claim 23, wherein said system includes timing means for establishing sequentially occurring basic cycles for said system, wherein said memory contains operand and command sections and a working register section, and wherein said logical circuit means includes memory address means operative to permit only a selected location in a selected one of the memory sections to be accessed during each cycle, whereby access to said sections is on a serial basis.

27. The invention in accordance with claim 23, wherein said means for establishing a plurality of micro-command operations includes means for providing a plurality of micro-command signals respectively corresponding to said micro-command operations, wherein said means for establishing a plurality of program count operations includes means for providing a plurality of program count signals respectively corresponding to said program count operations, wherein said system includes timing means for establishing sequentially occurring basic cycles for the performance of said program count operations such that one program count operation is performed for each basic cycle, and wherein said logical circuit means is responsive to said micro-command signals and said program count signals for determining the operations to be performed during each basic cycle.

28. The invention in accordance with claim 23, wherein said system includes timing means for establishing sequentially occurring basic cycles for said system, each cycle corresponding to a program count operation, wherein said means for establishing a plurality of micro-command operations includes first and second program control registers, said second program control register providing a plurality of micro-command output signals respectively corresponding to said micro-command operations, wherein said logical circuit means includes means for causing said first register to be set during the cycle corresponding to the last program count operation of each micro-command operation to correspond to the next micro-command operation to be performed, and wherein said logical circuit means also includes means for causing said second register to be set in accordance with said first register during the cycle corresponding to the first program count of each micro-command.

29. The invention in accordance with claim 28, wherein said system includes a plurality of peripherals, wherein one of said micro-command operations is provided to perform input-output data transfer operations with respect to a selected peripheral, and wherein said logical circuit means includes means responsive to a request signal from a selected peripheral for preventing said second register from being set in accordance with said first register during the cycle corresponding to the first program count of a micro-command and instead causing said second register to be set to correspond to the input-output micro-command operation, said logical circuit means also including means for maintaining the setting of said first register until completion of the input-output micro-command operation, whereby an input-output data transfer micro-command operation can be inserted following the completion of a micro-command after which system operation will continue frim the point of interruption.

30. The invention in accordance with claim 28, wherein said means for establishing a plurality of program count operations is a program counter restricted to count sequentially in synchronism with the generation of said basic cycles, and wherein said logical circuit means includes means for causing said program counter to be set to an initial count during the cycle corresponding to the first program count of each micro-command.

31. The invention in accordance with claim 30, wherein said logical circuit means includes a first address register for addressing selected locations in the operand and data sections of said memory and a second address register for addressing selected locations in the working register section of said memory, address register control means operable each cycle in response to said micro-command output signals and said program counter to permit either the first or second address register to select the location in memory which is to be accessed during the cycle, and means operative during the cycle corresponding to the last program count of a micro-command for causing said second address register to be set in accordance with the next micro-command setting set into said first adddress register and for causing said addres register control means to be set to permit said second addres register to access said memory during the next cycle, whereby to provide the starting address for the next micro-command.

32. The invention in accordance with claim 31, wherein said system includes at least one peripheral cooperating therewith, and wherein said logical circuit means also includes means for causing said second address register to be selectively settable during the cycle corresponding to the least program count of a micro-command to an address derived from a peripheral instead of in accordance with said second program control register.

33. In a data processing system, a high speed random access memory containing operand and command storage sections and a working register storage section, means for establishing a family of commands for said system at least predetermined ones of which are two address commands, said two address commands being codable in either one address or two address form, means for initiating execution of a command by reading out the command from the command storage section to said memory, means operable during the execution of a two address command coded in two address form to store in said working register storage section in memory address data corresponding to the second operand of the command which is retained therein after completion of the command, means operable during the execution of a two address command from said working register for use in deriving the address of the second operand, and means for executing a two address command by reading out the two operands corresponding thereto and performing the processing thereon indicated by the command.

34. The invention in accordance with claim 33, wherein access to said operand, command, and working register storage sections of said memory is restricted to a serial access basis.

35. The invention in accordance with claim 33, wherein said system includes means for establishing a plurality of micro-command operations, each command corresponding to a predetermined group of said micro-command operations, said system being constructed and arranged to execute each command serially performing its respective predetermined group of micro-command operations, and means for establishing a plurality of program count operations, said system being constructed and arranged to perform each micro-command operation serially performing a variable number of said program count operations.

36. The invention in accordance with claim 33, wherein said working register storage section includes a plurality of index registers, wherein each command indicates whether indexing is to be performed, wherein said system is operative during execution of a command indicating indexing is to be performed to access a selected index register and combine the contents thereof with operand address data contained in the command in order to derive the address of an operand, wherein the system operates during execution of a two address command coded in two address form to store the combined index register contents and command address data corresponding to the second operand in the working register storage section of said memory, and wherein the system operates during execution of a two address command coded in one address form to accept this combined address data in the working register storage section of said memory for use in deriving the address of the second operand.

37. The invention in accordance with claim 36, wherein said system includes means selectively operative in response to data provided by a command to store the combined selected index register contents and the command address data of an operand into the selected index register indicated by the command.

38. In a data processing system having a family of commands performable in sequential order, a high speed random access memory providing reading or writing with respect to a selected location therein, a plurality of peripherals cooperating with the system to permit the transfer of data between said peripherals and said memory, means for establishing a plurality of micro-command operations one of which is an input-output micro-command operation which causes the system to operate in response to a request from a selected peripheral to transfer a data character from the selected peripheral to a selected location in said memory or from a selected location in said memory to the selected peripheral, and logical circuit means cooperating with said memory for executing each command by serially performing a respective predetermined combination of said micro-commands, said logical circuit means including means for detecting during the performance of a micro-command when a selected peripheral is requesting a data transfer operation and in response thereto causing said input-output micro-command operation to be inserted at the completion of the micro-command operation during which the detection occurred.

39. The invention in accordance with claim 38, wherein said system includes means for establishing sequentially occurring basic cycles for said system, and wherein said system is constructed and arranged to perform each micro-command by the performance of a variable plurality of program counts advancing in a fixed sequential order in synchronism with said basic cycles.

40. The invention in accordance with claim 38, wherein said memory includes a plurality of input-output registers respectively corresponding to said peripherals, and wherein said logical circuit means includes means operative during an input-output micro-command and responsive to signals from the selected peripheral requesting a transfer operation for addressing the input-output register in said memory corresponding thereto.

41. The invention in accordance with claim 39, wherein said logical circuit means includes means operative during an input-output micro-command for keeping track of the number of data characters transferred between said memory and the selected peripheral during a plurality of input-output micro-commands performed with respect to the selected peripheral and for storing said number in the corresponding peripheral input-output register in said memory prior to completion of the input-output micro-command.

42. The invention in accordance with claim 40, wherein said family of commands includes an input-output command, wherein a second input-output register is provided in said memory corresponding to each peripheral, and wherein said logical circuit means is operative during an input-output command for accessing the second input-output register in memory corresponding to the peripheral to be selected and for storing a status signal therein in response to the condition of the selected peripheral.

43. The invention in accordance with claim 40, wherein said system is capable of operating in either a user or supervisor state, wherein said memory includes a set of user registers and a corresponding set of supervisor registers, wherein said logical circuit means includes indicating means for indicating whether the system is in the supervisor or user state, wherein said logical circuit means also includes means responsive to said input-output register corresponding to a selected peripheral for setting said indicating means to indicate a supervisor state when said number indicates that a predetermined number of characters have been transferred, and wherein said logical circuit means further includes address means responsive to said indicating means for causing addressing of said user registers when said indicating means indicates the system is in the user state and modification of said addressing to address said supervisor registers when said indicating means indicates the system is in the supervisor state.

44. In a data processing system, timing means for establishing sequentially occurring basic cycles for said system, a high speed random access memory containing operand and command storage sections and a working register storage section, logical circuit means cooperating with said memory, and program control means cooperating with said logical circuit means, said logical circuit means including a first address register for addressing selected locations in the operand and command storage sections of said memory, a second address register for addressing selected locations in the working register storage section of said memory, address register control means operable each cycle to permit either the first or second address register to select the location in memory which is to be accessed during a cycle, means for causing said memory to perform a read or write operation during each cycle with respect to the location selected, first and second data registers, an adder having a first input to which data read out of said memory during a cycle is applied and having a second input to which outputs from any one of said address registers and said data registers may be selectively applied during a cycle, said adder having an output which may be selectively applied to any one of said data registers and said first address register for setting during a cycle in accordance therewith, and control logic means responsive to said program control means for controlling the operations of said logical circuit means during each cycle.

45. The invention in accordance with claim 44, wherein said program control means includes means for providing micro-command output signals representing micro-command operations of said system and program count output signals representing steps within a micro-command, only one micro-command output signal and only one program count output signal being activated during each cycle, said program count output signals advancing in a predetermined fixed order in synchronism with the occurrence of said basic cycles, and wherein said control logic means is responsive to said micro-command and program count output signals.

46. The invention in accordance with claim 45, wherein the advancement of said program count output signals is further controlled so as to permit resetting to an initial count after any program count.

References Cited

UNITED STATES PATENTS

| | | | |
|---|---|---|---|
| 3,268,871 | 8/1966 | Handler | 340—172.5 |
| 3,300,764 | 1/1967 | Doelz | 340—172.5 |
| 3,302,183 | 1/1967 | Bennett | 340—172.5 |
| 3,380,025 | 4/1968 | Ragland | 340—172.5 |
| 3,391,394 | 7/1968 | Ottaway | 340—172.5 |
| 3,247,489 | 4/1966 | Sussenguth | 340—172.5 |

PAUL J. HENON, Primary Examiner

RONALD F. CHAPURAN, Assistant Examiner

UNITED STATES PATENT OFFICE
CERTIFICATE OF CORRECTION

Patent No. 3,493,936                          February 3, 1970

Robert O. Gunderson et al.

It is certified that error appears in the above identified patent and that said Letters Patent are hereby corrected as shown below:

Column 8, line 45, "PAC" should read -- PACK --. Column 10, line 44, "access" should read -- accessed --. Column 13, line 4, "425,105" should read -- 426,105 --. Column 15, line 52, "$K_{IO}$" should read -- $K_{I/O}$ --. Column 17, line 73, "MBB" should read -- MB --. Column 20, line 33, "NA-1" should read -- LA-1 --. Column 21, line 30, "$LA_42$" should read -- LA-2 --. Column 23, line 6, "$N_{02}P_{05}$:LBad$A_2R^*$:R:$A_2$" should read -- $N_{02}P_{02}$: LA ad $I_1R_1^*$: R : $I_1R_1$ --. Column 24, line 12, "$C_1W_1$" should read -- $C_1W_1+1$ --; line 13, "incremented" should read -- decremented --. Column 25, line 17, "$KL_p$" should read -- $KL_p'$ --. Column 26, line 67, ":ad$T_1R^*$" should read -- :ad$A_1R^*$ --. Column 27, line 7, "$adb_1$" should read -- $ada_1$ --; line 16, "Cycle $N_{09}P_{05}$" should read -- Cycle $N_{09}P_{06}$ --. Column 31, line 19, after "plurality", second occurrence, insert -- of program control signals during each basic cycle, and wherein said logical circuit means includes logical circuitry responsive to particular combinations of said program control signals. --; line 20, cancel "present cycle."; line 26, after "the" insert -- present cycle. --; line 33, beginning with "in said" cancel all to and including "signals." in line 37, same column 31; line 39, after "where-" insert -- in said system includes at least one peripheral cooperating --. Column 32, line 6, "epripheral" should read -- peripheral --.

Signed and sealed this 1st day of December 1970.

(SEAL)
Attest:

EDWARD M.FLETCHER,JR.                        WILLIAM E. SCHUYLER, JR.
Attesting Officer                              Commissioner of Patents